US012696348B2

(12) United States Patent
Wang et al.

(10) Patent No.: US 12,696,348 B2
(45) Date of Patent: Jul. 28, 2026

(54) METHODS, DEVICES, AND MEDIUM FOR COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 293 days.

(21) Appl. No.: 18/575,549

(22) PCT Filed: Jul. 2, 2021

(86) PCT No.: PCT/CN2021/104387
§ 371 (c)(1),
(2) Date: Dec. 29, 2023

(87) PCT Pub. No.: WO2023/272744
PCT Pub. Date: Jan. 5, 2023

(65) Prior Publication Data
US 2024/0334541 A1 Oct. 3, 2024

(51) Int. Cl.
*H04W 76/30* (2018.01)
*H04W 76/19* (2018.01)
*H04W 76/20* (2018.01)

(52) U.S. Cl.
CPC ........... *H04W 76/30* (2018.02); *H04W 76/19* (2018.02); *H04W 76/20* (2018.02)

(58) Field of Classification Search
CPC ...... H04W 76/30; H04W 76/19; H04W 76/20
See application file for complete search history.

(56) References Cited

U.S. PATENT DOCUMENTS

2006/0164981 A1* 7/2006 Olsson .................. H04L 1/1854
370/469
2018/0302914 A1 10/2018 de Silva et al.
(Continued)

FOREIGN PATENT DOCUMENTS

CN 108924882 A 11/2018
EP 4228333 A1 * 8/2023 ............ H04W 76/19
WO 2020/221861 A1 11/2020

OTHER PUBLICATIONS

Extended European Search Report for EP Application No. 21947688. 4, dated on Jul. 10, 2024.
(Continued)

*Primary Examiner* — Mohammad S Anwar
(74) *Attorney, Agent, or Firm* — Sughrue Mion, PLLC

(57) ABSTRACT

Example embodiments of the present disclosure relate to small data transmission. Although the present disclosure, the stored data is not taken into consideration when calculating data volume for small data transmission, and thus correct data volume value can be obtained thereby. Further, the terminal device may obtain information about volume of new data before calculating data volume for small data transmission. In addition, during small data transmission, the reported buffer status report may indicate an actual state of the remaining small data transmission data. Further, when the terminal device fails to transmit small data transmission data via 4-step random access procedure, the terminal device may fall back to 4-step random access small data transmission properly.

16 Claims, 21 Drawing Sheets

(56) References Cited

U.S. PATENT DOCUMENTS

2020/0092905 A1    3/2020  Vos et al.
2021/0337625 A1* 10/2021  Tsai ..................... H04W 76/30

OTHER PUBLICATIONS

Huawei et al, "User plane common aspects for SDT", 3GPP Draft, R2-2103531, Apr. 2, 2021, pp. 1-pp. 5.

OPPO, "Discussion on SDT user plane issues", 3GPP Draft, R2-2100282, Jan. 15, 2021. pp. 1-pp. 5.

JP Office Communication for JP Application No. 2023-580754, mailed on Feb. 4, 2025 with English Translation.

OPPO, "Discussion on user plane issues of SDT", 3GPP TSG RAN WG2 #113bis-e R2-2102750, Apr. 2, 2021, pp. 1-pp. 7.

Intel Corporation 3GPP TSG RAN WG2 Meeting #114 R2-2104881, Failure and Successful handing for an SDT session, May 27, 2021, 16 Pages.

NEC 3GPP TSG-RAN WG2 #114 electronic R2-2105447 Reaming user plane aspects of SDT, May 27, 2021, 2 pages.

International Search Repot for PCT/CN2021/104387 dated Mar. 28, 2022.

* cited by examiner

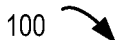
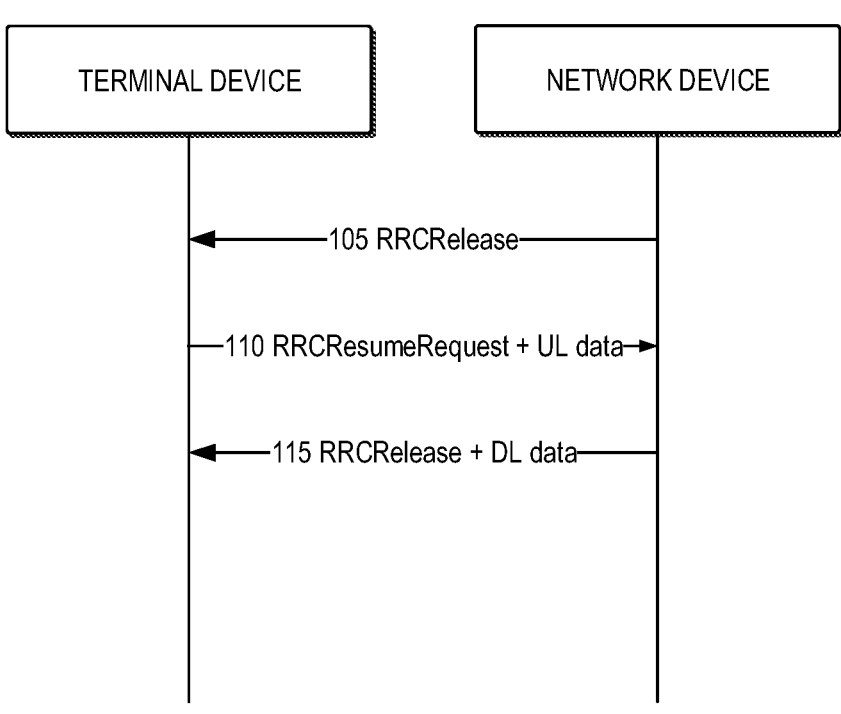
Fig. 1A

600

610

DISCARD STORED DATA FOR AT LEAST ONE RADIO BEARER CONFIGURED FOR SMALL DATA TRANSMISSION

620

CALCULATE DATA VOLUME TO BE USED BY THE TERMINAL DEVICE FOR DETERMINING WHETHER TO PERFORM A SMALL DATA TRANSMISSION AFTER DISCARDING THE STORED DATA

Figure 7:
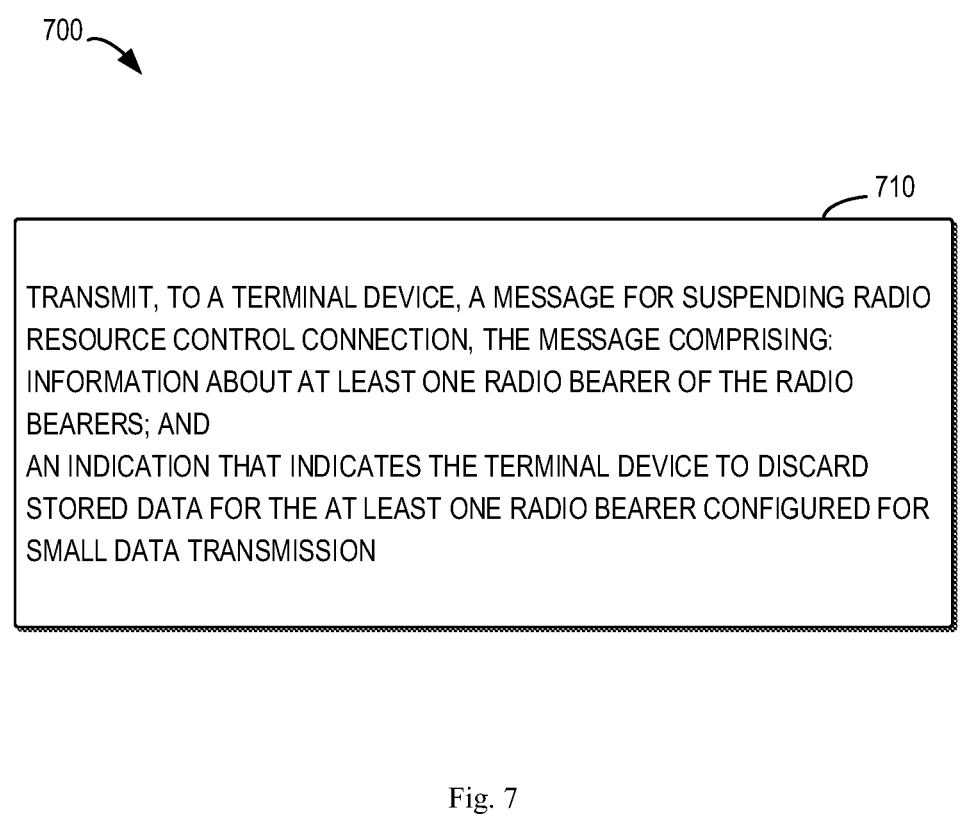

700

710

TRANSMIT, TO A TERMINAL DEVICE, A MESSAGE FOR SUSPENDING RADIO
RESOURCE CONTROL CONNECTION, THE MESSAGE COMPRISING:
INFORMATION ABOUT AT LEAST ONE RADIO BEARER OF THE RADIO
BEARERS; AND
AN INDICATION THAT INDICATES THE TERMINAL DEVICE TO DISCARD
STORED DATA FOR THE AT LEAST ONE RADIO BEARER CONFIGURED FOR
SMALL DATA TRANSMISSION

Figure 10:
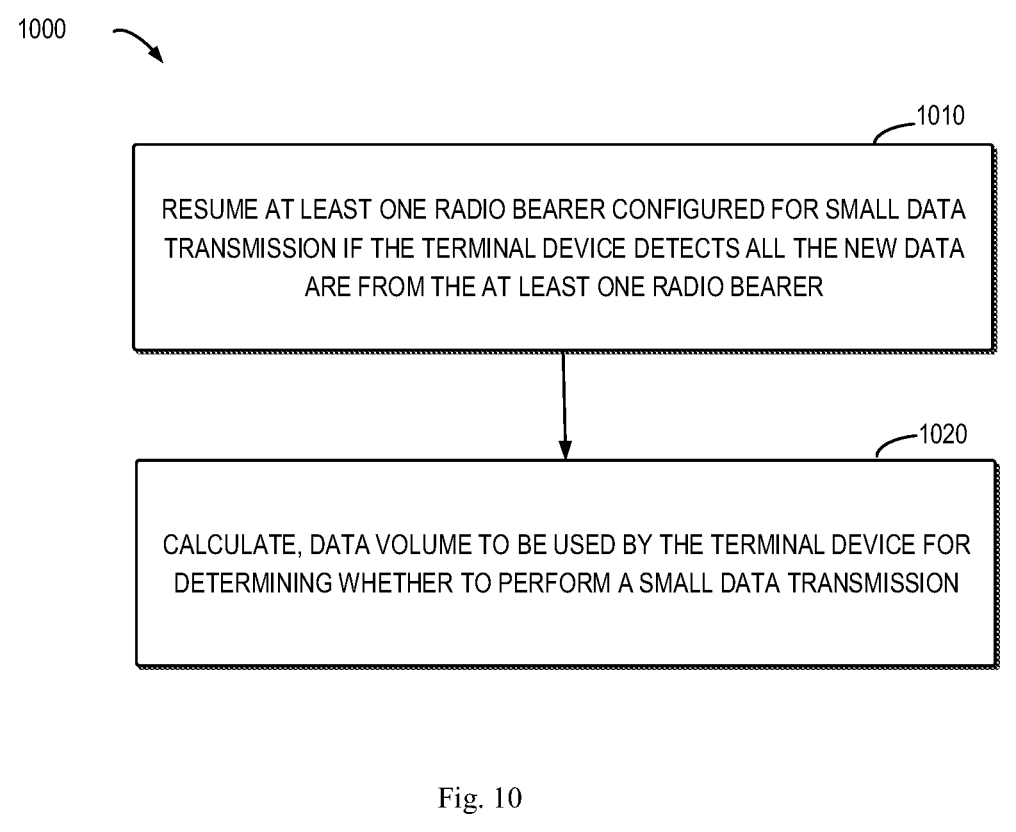

RESUME AT LEAST ONE RADIO BEARER CONFIGURED FOR SMALL DATA TRANSMISSION IF THE TERMINAL DEVICE DETECTS ALL THE NEW DATA ARE FROM THE AT LEAST ONE RADIO BEARER

1020

CALCULATE, DATA VOLUME TO BE USED BY THE TERMINAL DEVICE FOR DETERMINING WHETHER TO PERFORM A SMALL DATA TRANSMISSION

210
TERMINAL DEVICE

220
NETWORK DEVICE

1210

1220

1300

Figure 15:
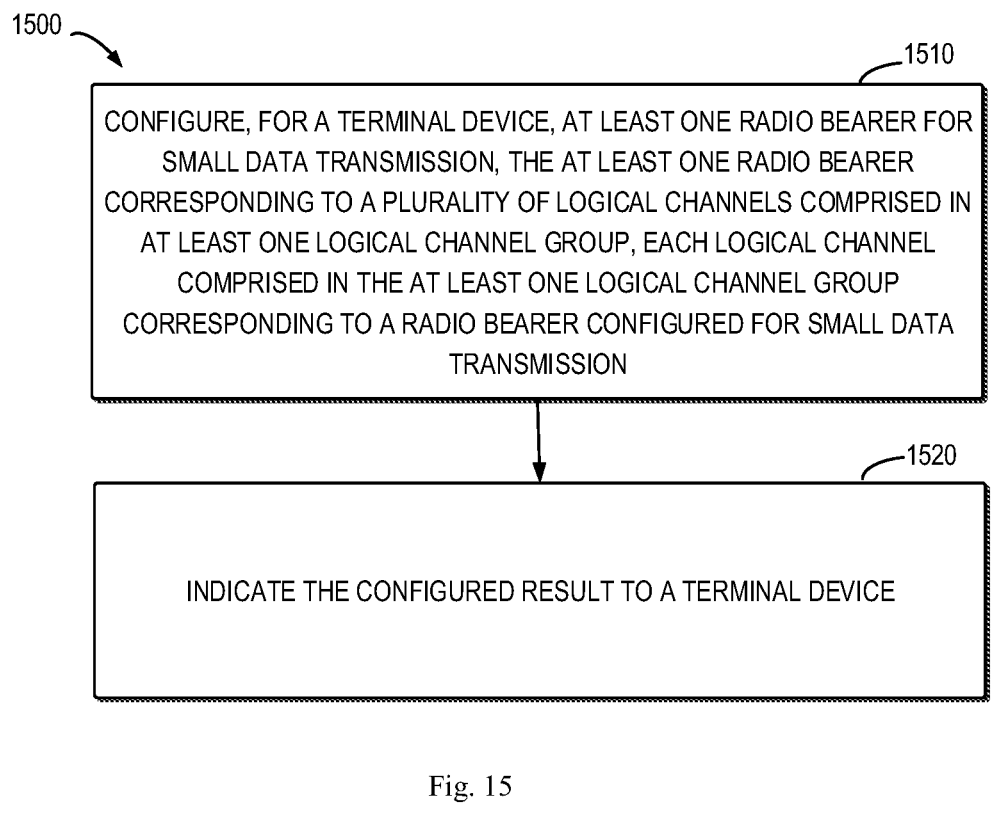

1500

1510

CONFIGURE, FOR A TERMINAL DEVICE, AT LEAST ONE RADIO BEARER FOR SMALL DATA TRANSMISSION, THE AT LEAST ONE RADIO BEARER CORRESPONDING TO A PLURALITY OF LOGICAL CHANNELS COMPRISED IN AT LEAST ONE LOGICAL CHANNEL GROUP, EACH LOGICAL CHANNEL COMPRISED IN THE AT LEAST ONE LOGICAL CHANNEL GROUP CORRESPONDING TO A RADIO BEARER CONFIGURED FOR SMALL DATA TRANSMISSION

1520

INDICATE THE CONFIGURED RESULT TO A TERMINAL DEVICE

Figure 17:
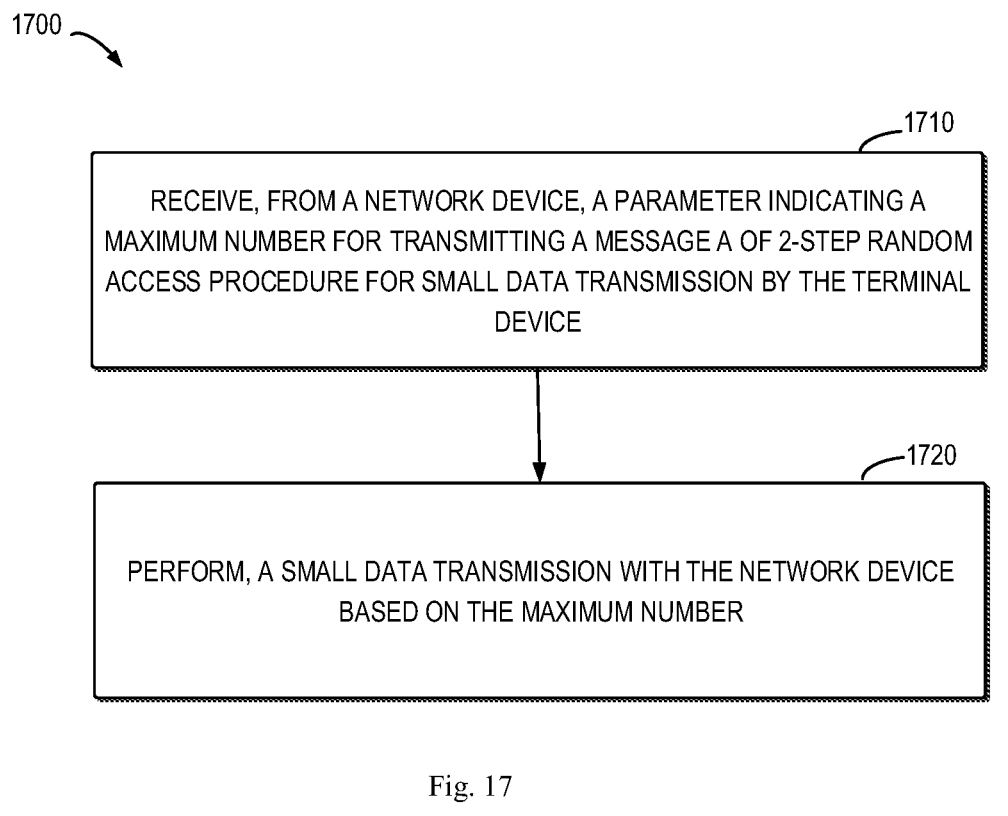

RECEIVE, FROM A NETWORK DEVICE, A PARAMETER INDICATING A MAXIMUM NUMBER FOR TRANSMITTING A MESSAGE A OF 2-STEP RANDOM ACCESS PROCEDURE FOR SMALL DATA TRANSMISSION BY THE TERMINAL DEVICE

1720

PERFORM, A SMALL DATA TRANSMISSION WITH THE NETWORK DEVICE BASED ON THE MAXIMUM NUMBER

TRANSMIT, TO A TERMINAL DEVICE, A PARAMETER INDICATING A
MAXIMUM NUMBER FOR TRANSMITTING MESSAGE A OF 2-STEP RANDOM
ACCESS PROCEDURE FOR SMALL DATA TRANSMISSION BY THE TERMINAL
DEVICE

METHODS, DEVICES, AND MEDIUM FOR COMMUNICATION

This Application is a National Stage of International Application No. PCT/CN2021/104387 filed Jul. 2, 2021.

FIELD

Embodiments of the present disclosure generally relate to the field of telecommunication, and in particular, to methods, devices, and medium for communication.

BACKGROUND

Power consumption of a terminal device is a focus in current wireless communication system. In order to reduce power consumption of the terminal device, it is proposed that the terminal device may be configured in some power saving modes/states (such as, inactive state). As for a terminal device in an inactive state, normal data transmissions are proposed to be suspended. Generally speaking, if the terminal device in the inactive state needs to perform normal transmission with a network device, the terminal device has to resume a connection with the network device (i.e., wake up and transform into a connected state).

In order to further reduce power consumption, a solution for enabling small data transmission (SDT) for the terminal device in the inactive state is proposed by a work item of the third Generation Partnership Project (3GPP). By using SDT, the terminal device in the inactive state may maintain the inactive mode while enabling an uplink (UL) transmission and downlink (DL) transmission following an original UL transmission.

SUMMARY

In general, example embodiments of the present disclosure provide solutions of communication for a device in an inactive state. Embodiments that do not fall under the scope of the claims, if any, are to be interpreted as examples useful for understanding various embodiments of the disclosure.

In a first aspect, there is provided a method of communication. The method comprises: discarding, at a terminal device, stored data for at least one radio bearer configured for small data transmission; and calculating data volume to be used by the terminal device for determining whether to perform a small data transmission after discarding the stored data.

In a second aspect, there is provided a method of communication. The method comprises: transmitting, at a network device to a terminal device, a message for suspending radio resource control connection, the message comprising: information about at least one radio bearer of the radio bearers, the at least one radio bearer being configured by the network device for small data transmission; and an indication that indicates the terminal device to discard stored data for the at least one radio bearer configured for small data transmission.

In a third aspect, there is provided a method of communication. The method comprises: obtaining, at a terminal device, information about volume of new data needed to be transmitted to a network, wherein the information is provided from a layer of the terminal device higher than the packet data convergence protocol layer to a layer of the terminal device responsible for calculating data volume to be used by the terminal device for determining whether to perform a small data transmission; and if all the new data is from at least one radio bearer configured for small data transmission, calculating, at the layer responsible for calculating the data volume, the data volume at least in part based on the information.

In a fourth aspect, there is provided a method of communication. The method comprises: resuming, at a terminal device in an inactive state, at least one radio bearer configured for small data transmission if the terminal device detects all the new data is from the at least one radio bearer; and calculating, data volume to be used by the terminal device for determining whether to perform a small data transmission.

In a fifth aspect, there is provided a method of communication. The method comprises: generating, at a terminal device being performing a small data transmission with a network device, a buffer status report indicating a buffer status associated with at least one of the following: radio bearers being configured for small data transmission, radio bearers being non-suspended, logical channels corresponding to the radio bearers being configured for small data transmission, or logical channels corresponding to the radio bearers being non-suspended; and transmitting the buffer status report to the network device.

In a sixth aspect, there is provided a method of communication. The method comprises: if a logical channel group comprises at least one logical channel corresponding to radio bearers being suspended and at least one further logical channel corresponding to radio bearers being non-suspended, generating, at a terminal device being performing a small data transmission with a network device, a buffer status report for the logical channel group without considering at least one of the following: radio bearers not being configured for small data transmission, radio bearers being suspended, logical channels corresponding to the radio bearers not being configured for small data transmission, or logical channels corresponding to the radio bearers being suspended; and transmitting the buffer status report to the network device.

In a seventh aspect, there is provided a method of communication. The method comprises: configuring, at a network device and for a terminal device, at least one radio bearer for small data transmission, the at least one radio bearer corresponding to a plurality of logical channels comprised in at least one logical channel group, each logical channel comprised in the at least one logical channel group corresponding to a radio bearer configured for small data transmission; and indicating the configured result to a terminal device.

In an eighth aspect, there is provided a method of communication. The method comprises: receiving, at a terminal device and from a network device, a parameter indicating a maximum number for transmitting a message A of 2-step random access procedure for small data transmission by the terminal device when the terminal device is configured with both of 4-step random access procedure resources for small data transmission and 2-step random access procedure resources for small data transmission; and performing, a small data transmission with the network device based on the maximum number.

In a ninth aspect, there is provided a method of communication. The method comprises: transmitting, at a network device to a terminal device, a parameter indicating a maximum number for transmitting message A of 2-step random access procedure for small data transmission by the terminal device when the terminal device is configured with both 4-step random access procedure resources for small data transmission and 2-step random access procedure resources for small data transmission.

In a tenth aspect, there is provided a terminal device. The terminal device includes a processing unit; and a memory coupled to the processing unit and storing instructions thereon, the instructions, when executed by the processing unit, causing the device to perform the method according to the first aspect.

In an eleventh aspect, there is provided a network device. The network device includes a processing unit; and a memory coupled to the processing unit and storing instructions thereon, the instructions, when executed by the processing unit, causing the device to perform the method according to the second aspect.

In a twelfth aspect, there is provided a terminal device. The terminal device includes a processing unit; and a memory coupled to the processing unit and storing instructions thereon, the instructions, when executed by the processing unit, causing the device to perform the method according to the third aspect.

In a thirteenth aspect, there is provided a terminal device. The terminal device includes a processing unit; and a memory coupled to the processing unit and storing instructions thereon, the instructions, when executed by the processing unit, causing the device to perform the method according to the fourth aspect.

In a fourteenth aspect, there is provided a terminal device. The terminal device includes a processing unit; and a memory coupled to the processing unit and storing instructions thereon, the instructions, when executed by the processing unit, causing the device to perform the method according to the fifth aspect.

In a fifteenth aspect, there is provided a terminal device. The terminal device includes a processing unit; and a memory coupled to the processing unit and storing instructions thereon, the instructions, when executed by the processing unit, causing the device to perform the method according to the sixth aspect.

In a sixteenth aspect, there is provided a network device. The network device includes a processing unit; and a memory coupled to the processing unit and storing instructions thereon, the instructions, when executed by the processing unit, causing the device to perform the method according to the seventh aspect.

In a seventeenth aspect, there is provided a terminal device. The terminal device includes a processing unit; and a memory coupled to the processing unit and storing instructions thereon, the instructions, when executed by the processing unit, causing the device to perform the method according to the eighth aspect.

In an eighteenth aspect, there is provided a network device. The network device includes a processing unit; and a memory coupled to the processing unit and storing instructions thereon, the instructions, when executed by the processing unit, causing the device to perform the method according to the ninth aspect.

In a nineteenth aspect, there is provided a computer readable medium having instructions stored thereon, the instructions, when executed on at least one processor, causing the at least one processor to carry out the method according to any of the above first to ninth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIGS. 1A and 1B illustrate signaling flows for SDT;

FIG. 7 illustrates an example method performed by a network device for handling stored data according to some embodiments of the present disclosure;

FIG. 10 illustrates example method performed by the terminal device for resuming RS(s) in advance according to some embodiments of the present disclosure;

FIG. 15 illustrates a further example method for handling BSR according to some embodiments of the present disclosure;

FIG. 17 illustrates an example method for falling back to 4-step RA based SDT procedure performed by a terminal device according to some embodiments of the present disclosure;

Throughout the drawings, the same or similar reference numerals represent the same or similar element.

DETAILED DESCRIPTION

Figure 1B:
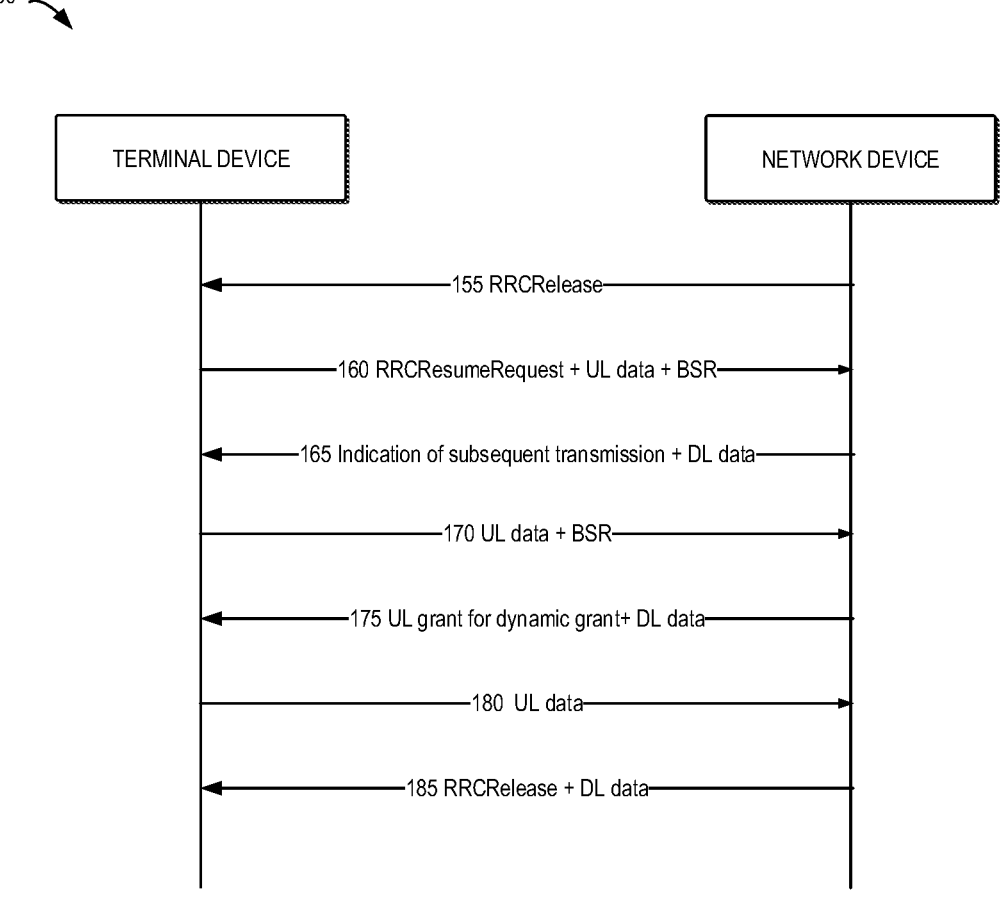

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB), a Remote Radio Unit (RRU), a radio head (RH), a remote radio head (RRH), a low power node, such as, a femto node, a pico node, a satellite network device, an aircraft network device, and the like. For the purpose of discussion, in the following, some example embodiments will be described with reference to eNB as examples of the network device.

As used herein, the term "terminal device" refers to any end device that may be capable of wireless communication. By way of example rather than limitation, a terminal device may also be referred to as a communication device, a user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or a processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discussed above, in order to reduce power consumption for a terminal device in the wireless communication, the terminal device may be configured in some power saving states or modes. For example, a Radio Resource Control (RRC) inactive state has been proposed and defined by a work item of the 3GPP. Further, as discussed above, in order to further reduce power consumption, a solution for enabling SDT for the terminal device in the RRC inactive state is proposed by a work item of the 3GPP, such that the terminal device in the inactive RRC state may maintain the inactive RRC state while enabling a data transmission.

Generally speaking, SDT is a procedure allowing data transmission while remaining in RRC inactive state (i.e., without transitioning into RRC connection state). Further, SDT is enabled on a radio bearer basis and is initiated by the terminal device only if the data volume of UL data needed to be transmitted across all radio bearers configured for SDT is less than a data volume threshold (such as, a configured volume) and the measured Reference Signal Receiving Power (RSRP) in the cell is above a configured threshold. Due to the requirements of the data volume, SDT is proposed to be applied for some specific application scenarios. Some example application scenarios of SDT for a smart terminal device may include, but not limited to the following:

Traffic/data/packet from instant messaging services (for example, whatsapp, QQ, wechat, MSN, and the like);

Heart-beat/keep-alive traffic/data/packet from some applications (for example, instant application, email application, and the like); and Push notifications from various applications.

Some example application scenarios of SDT for a non-smart terminal device may include, but not limited to the following:

Traffic/data/packet from wearables (for example, periodic positioning information, reference signal, and the like);

Periodic or non-Periodic traffic/data/packet from sensors (for example, temperature sample, pressure sample, and the parameter from industrial wireless sensor networks); and Periodic meter readings from smart mete device and smart meter network device.

Currently, two solutions for enabling SDT are proposed, including random access (RA)-based SDT and configured grant (CG)-based SDT.

As for RA-based SDT, the data for SDT is transmitted by using random access channel (RACH) procedure including 2-step RACH procedure and 4-step RACH procedure. More specifically, the first UL data is transmitted via message A of 2-step RACH procedure or message 3 of 4-step RACH procedure to the network device by the terminal device in an inactive state. As for CG-based SDT, the first UL data is transmitted in CG resource.

Reference is made to FIG. 1A, which shows a signaling flow 100 for one-shot SDT according to some embodiments. In operation, the network device transmits 105 a RRC release message to the terminal device. After receiving the RRC release message, the terminal device may transition into the inactive state. When the terminal device is in the inactive state and has SDT data (i.e., UL data) needed to be transmitted to the network device, the terminal device transmits 110 an RRCResumeRequest message to the network device. The UL data may be transmitted together with the RRCResumeRequest. The network device transmits 115 an RRCRelease message to the terminal device. Additionally, the network device may transmit DL data (if there is) together with the RRCRelease message to the terminal device.

In addition to the above one-shot SDT procedure, the terminal device may send/receive multiple UL and DL packets as part of the same SDT procedure and without transitioning to RRC connected state when the terminal device is in the RRC inactive state.

Reference is made to FIG. 1B, which shows a signaling flow 150 for an SDT procedure including an initial data transmission and subsequent data transmissions according to some embodiments. As illustrated in FIG. 1B, the network device transmits 155 an RRC release message to the terminal device. After receiving the RRC release message, the terminal device may transition into the inactive state. Then, if the terminal device needs to transmit UL data to the network device, the terminal device transmits 160 an RRCResumeRequest message and the UL data to the network device. Further, the terminal device also transmitted a buffer status report (BSR) together with the RRCResumeRequest message, where the BSR indicates that there is still remaining data needed to be transmitted to the network device. With the BSR from the terminal device, the network device would be informed that there is still remaining data needed to be transmitted by the terminal device. The network device may respond 165 an indication of subsequent transmission to the terminal device, where the indication could be explicit RRC message or implicit message (for example, UL grant for further transmission). Additionally, the network device may transmit DL data if there is to the terminal device.

In the following, the terminal device transmits 170 UL data and a further BSR to the network device and the network device transmits 175 an UL grant for dynamic grant and an additional DL data if there is to the terminal device accordingly. After that, the terminal device transmits 180 UL data to the network device. For the specific example of FIG. 1B, as there is no remaining data to be transmitted, the terminal device does not transmit a BSR to the network device. Accordingly, in view of the absence of BSR, the network device may transmit 185 an RRC Release message and additional DL data to the terminal device.

Although some discussions/agreements for SDT have been made, there are still some pending issues needed to be discussed and addressed. For example, it is desirable to propose and discuss technical details about calculating data volume for SDT, generating and reporting BSR for SDT and falling back from 2-step RA based SDT procedure to 4-step RA based SDT procedure. In the present disclosure, the above listed pending issues will be discussed in detail.

As used herein, the term "small data transmission data", or "SDT data" refers to the data that could be transmitted by a terminal device in the inactive state, in an idle statue, and in the connected state. Generally speaking, the "small data transmission data" or "SDT data" is carried in radio bearer(s) (including signalling radio bearer(s) (SRB(s)) and data radio bearer(s) (DRB(s)) which is configured for SDT, or resulted/triggered by a service/function/application which is configured for SDT.

As used herein, the term "non-small data transmission data" or "non-SDT data" refers to the data that is not allowed to be transmitted during an SDT procedure. Generally speaking, the "non-small data transmission data" or "non-SDT data" is carried in a radio bearer(s) (including SRB(s) and DRB(s)) which is not configured for SDT, or resulted/triggered by a service/function/application which is not configured for SDT.

In the following, the SDT procedure is discussed in the example scenario that the terminal device in the inactive state. However, such specific example scenario should be considered as a limitation the present disclosure. It should be understood that if the SDT is supported/enabled in idle state, the example embodiments discussed herein also may be applied to the scenario that the terminal device in the idle state.

In the following, an SDT procedure will be used as an example of a transmission procedure for describing some example embodiments of the present disclosure. It is to be understood that example embodiments of the present disclosure are equally applicable to other non-connected state transmission (such as, early data transmission (EDT) or preconfigured uplink resource (PUR)).

In the following, the phrases (and their equivalent expressions) of "performing SDT", "during SDT" and "timer for SDT being running" can be used interchangeably.

Further, in the following, when describing the data to be processed, the phrases (and their equivalent expressions) of "packet data convergence protocol (PDCP) packet", "PDCP data", "PDCP protocol data unit (PDU)", "PDCP service data unit (SDU)" can be used interchangeably.

In addition, in the following, when describing the data to be processed, the phrases (and their equivalent expressions) of "radio link control (RLC) packet", "RLC data", "RLC PDU", "RLC SDU" can be used interchangeably.

Moreover, in the following, operations discussed in some specific examples/cases/embodiments are only for the purpose of illustration without suggesting any limitations. That is, such operations are not necessarily referring to the same examples/cases/embodiments. Further, when a particular example/case/embodiment is described in connection with an example/case/embodiment, it is submitted that it is within the knowledge of one skilled in the art to affect such operation in connection with other embodiments whether or not explicitly described.

In addition, it is to be understood that although examples/cases/embodiments are discussed in separate, such examples/cases/embodiments may be combined in any suitable manner. For example, the examples/cases/embodiments for calculating data volume for SDT may be combined with the examples/cases/embodiments for handing BSR.

Example Environment

Figure 2:
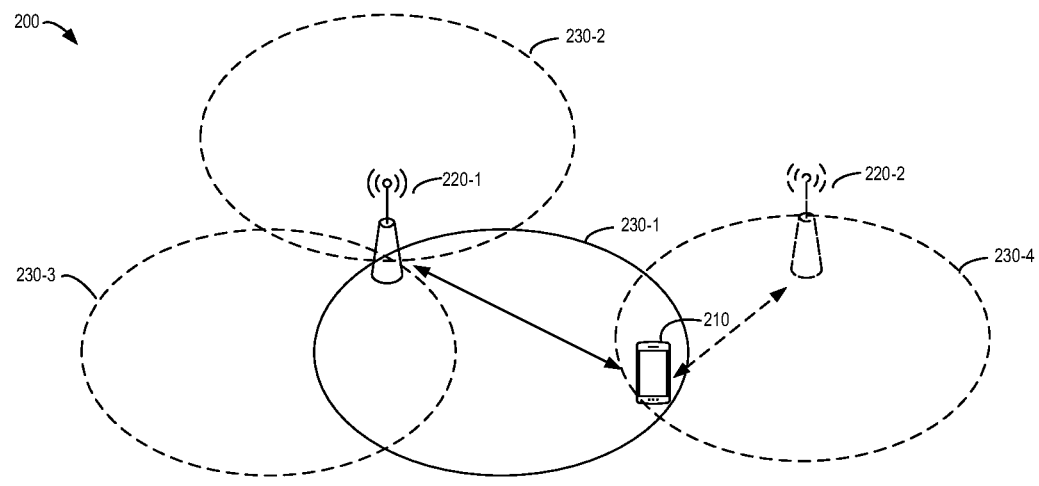
FIG. 2 illustrates an example communication environment in which example embodiments of the present disclosure can be implemented.

FIG. 2 shows an example communication environment 200 in which example embodiments of the present disclosure can be implemented. The network communication 200 includes a terminal device 210 and network devices 220-1 and 220-2 serving the terminal device 210. In the following text, the network device 220-1 and 220-2 are collectively referred to as the network devices 220 or individually referred to as the network device 220). Additionally, the network devices 220 may provide more than one serving area to the terminal device 210. In the specific example of FIG. 2, the network device 220-1 provides cells 230-1, 230-2 and 230-3 and the network device 220-2 provides cell 230-4. Cells 230-1 to 230-4 hereinafter are collectively referred to as the serving cells 230 or individually referred to as a serving cell 230.

In the communication environment 200, a link from the terminal device 210 to the network device 220 is referred to as an UL, while a link from the network device 220 to the terminal device 210 is referred to as a DL. In DL, the network device 220 is a transmitting (TX) device (or a transmitter) and the terminal device 210 is a receiving (RX) device (or a receiver). In UL, the terminal device 210 is a TX device (or a transmitter) and the network device 220 is a RX device (or a receiver).

In the specific example of FIG. 2, the terminal device 210 may be in different states (such as, connected state, inactive state and idle state). When the terminal device 210 is in connected state, the terminal device 210 can perform transmission of data from all radio bearers. Further, in some embodiments, when the terminal device 210 is in idle state, the terminal device usually is not allowed to perform any data transmission except specific scenario (such as, EDT or PUR). In addition, when the terminal device 210 is in the inactive state, an SDT is supported while a transmission of data not configure with SDT is not allowed during an SDT procedure. Further, a terminal device 210 in the inactive/idle state may transition into the connecting state by resuming/establishing a RRC connection with the network device 220. Such transition procedures may be initiated by either the terminal device 210 or the network device 220.

In addition, in the example of FIG. 2, the terminal device 210 may move over time. As illustrated in FIG. 2, the terminal device 210 locates at different positions over time. When moving, the terminal device 210 may communicate with different cells 230 or different network devices 220, which may be implemented by such as cell reselection procedure or handover procedure.

The communications in the communication environment 200 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

It is to be understood that the numbers and their connections of network device, terminal device and cell are only for the purpose of illustration without suggesting any limitations. The communication environment 200 may include any suitable network device, terminal device and cell adapted for implementing embodiments of the present disclosure. Although not shown, it is to be understood that one or more additional terminal devices may be located in the respective cells. It would also be appreciated that in some examples, only the homogeneous network deployment or only the heterogeneous network deployment may be included in the communication environment 200.

Example Processes for Calculating Data Volume for SDT

As discussed above, SDT cannot be applied to data transmission of large amounts of data. Therefore, it is proposed that a volume threshold may be used as an SDT selection criteria. Specifically, when the volume of SDT data is below the volume threshold, the terminal device is allowed to perform SDT. Otherwise, a non-SDT procedure is triggered.

Some options with regard to how to calculate data volume for SDT are proposed as below:

Option 1: Data volume used for SDT selection criteria is calculated same as the buffer size (BS). In other words, the data volume for SDT is summation of packet data convergence protocol (PDCP) data volume and radio link control (RLC) data volume without considering RLC and medium access control (MAC) headers.

Option 2: Data volume used for SDT selection criteria is the size of MAC protocol data unit (PDU). In other words, the data volume for SDT is summation of PDCP data volume, RLC data volume and overhead of MAC/RLC/PDCP/RRC/service data adaptation protocol (SDAP).

Option 3: Data volume used for SDT selection criteria is the PDCP data volume.

Option 4: Data volume used for SDT selection criteria is calculated as the total sum of BS across RBs configured for SDT.

Option 5: Data volume used for SDT selection criteria is left up to UE implementation.

Therefore, data volume used for SDT selection criteria may be left up to UE implementation or follows a unified process. Further, it is preferred that the data volume used for SDT selection criteria can be calculated similar to legacy BS and it is expected that data volume used for SDT selection criteria should be calculated as the total sum of BS across RBs configured for SDT.

Figure 3:
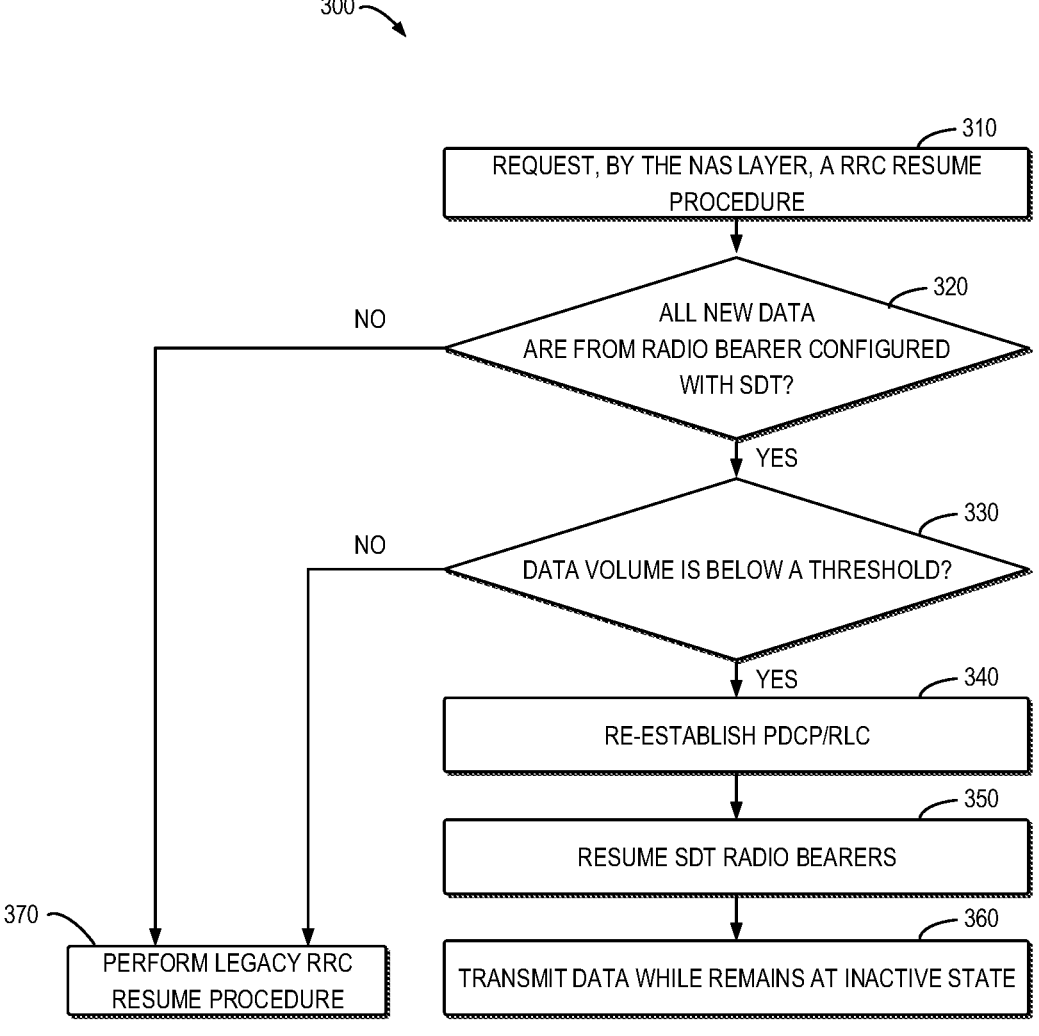
FIG. 3 illustrates a proposed method for calculating data volume for SDT.

Reference is made to FIG. 3, which illustrates a proposed method 300 for calculating data volume for SDT. As illustrated in FIG. 3, when there is new data needed to be transmitted to the network device, the non-access stratum of the terminal device transmits a request for resuming RRC connection to the access layer of the terminal device at block 310. At block 320, the terminal device determines that whether all new data is from RB configured with SDT. If so, at block 330, the terminal device will calculates the data volume for SDT and determines whether the calculated data volume is below a threshold. In case that the calculated data volume is below a threshold, the terminal device may trigger an SDT thereby. Specifically, the terminal device performs PDCP/RLC re-establishment procedure at block 340, resumes RBs configured for SDT at block 350 and transmits data to the network device while remains at inactive state at block 360. In the case that the terminal device determines that at least part of the new data is from radio bearer not configured with SDT or the calculated data volume exceeds the threshold, the process will proceed to block 370. At block 370, a legacy RRC Resume procedure will be performed.

In the above proposed process of FIG. 3, the operation of calculating the data volume for SDT is performed prior to performing PDCP/RLC re-establishment procedure, which means that when calculating the data volume for SDT, there may be still stored data at PDCP entities for SDT SRBs and stored data at RLC entities for SRB and UM RBs configured with SDT. However, the above stored should not be considered when calculating the data volume for SDT.

Generally speaking, if the RBs are suspended (i.e., have not been resumed), new data from higher layer (for example, NAS) is not able to be calculated as PDCP and RLC data volume. In the above proposed process of FIG. 3, the operation of calculating the data volume for SDT performed prior to performing RB resume procedure, which means when calculating the data volume for SDT, the new data has not been delivered to the PDCP layer or RLC layer. However, the volume of the new data should be considered when calculating the data volume for SDT.

It can be seen that the above proposed process for calculating data volume for SDT cannot obtain a correct data volume for SDT. According to example embodiments of the present disclosure, at least part of the above issues will be addressed.

In particular, it is to be understood that examples (i.e., example embodiments for handing stored data, example embodiments for obtaining volume of new data, example embodiments for resuming RS(s) in advance) discussed may be implemented in any suitable combination when calculating the data volume used for SDT selection criteria.

Example Embodiments for Handing Stored Data

As discussed above, the previously stored data should not be considered when calculating data volume for SDT. Therefore, it is expected that the terminal device 210 should discard the stored data before calculating data volume for SDT.

In accordance with some example embodiments of the present disclosure, there is provided a solution for communication. In this solution, the terminal device 210 discards the stored data (such as, PDCP packets, RLC packets) for at least one RB configured for SDT first, and calculates data volume to be used by the terminal device 210 for determining whether to perform an SDT after discarding the stored data. In this way, the stored data (such as, data stored at PDCP and RLC entities) may be handled properly. In other words, the previously stored data is not taken into consideration when calculating data volume for SDT, and thus correct data volume value can be obtained thereby.

Figure 4:
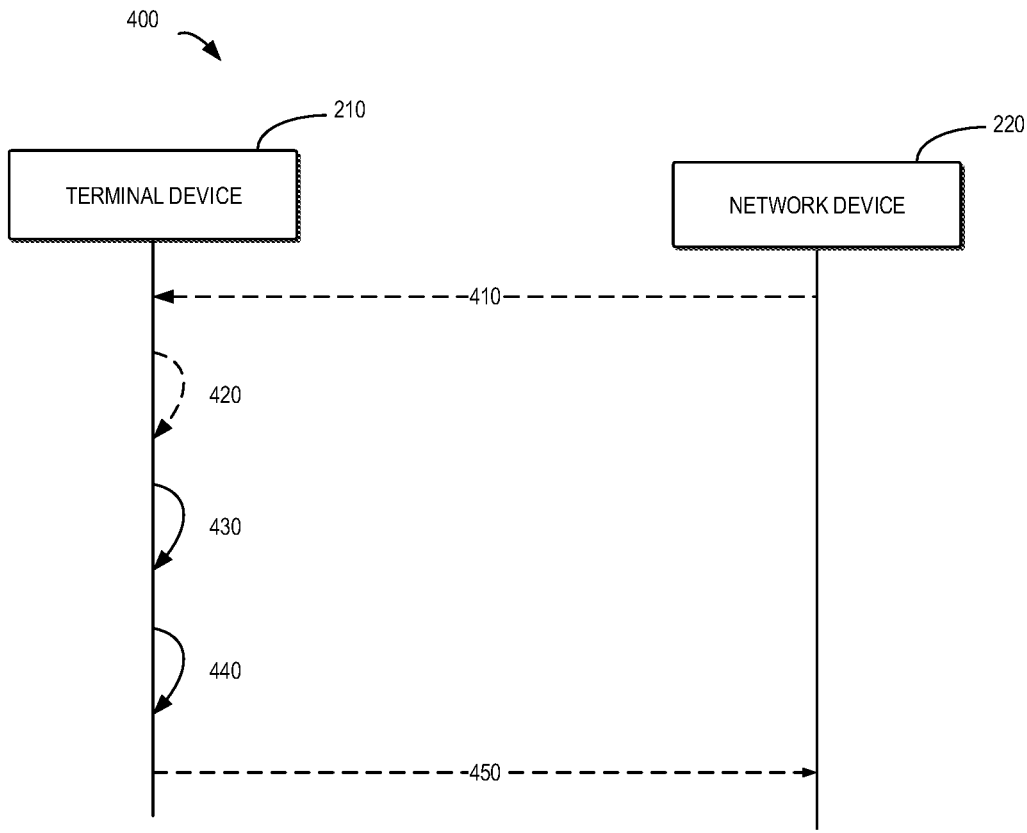
FIG. 4 illustrates a signaling chart illustrating a process for calculating data volume for SDT according to some embodiments of the present disclosure.

Reference is now made to FIG. 4, which shows a signaling flow 400 for calculating data volume for SDT according to some embodiments of the present disclosure. For the purpose of discussion, the signaling flow 400 will be described with reference to FIG. 2. The signaling flow 400 may involve a network device 220 and a terminal device 210.

In operation, the terminal device 210 discards 430 stored data for at least one RB configured for SDT and calculates 440 data volume to be used by the terminal device for determining whether to perform an SDT after discarding the stored data. In this way, the stored data being unnecessary for calculating data volume for SDT may be handled properly.

In some example embodiments, the stored data to be discarded is stored at a layer 2 entity of the terminal device 210. One example of the layer 2 entity is RLC entity. Another example of the layer 2 entity is PDCP entity.

Additionally, stored data may be any stored data being unnecessary for calculating data volume for SDT. As for RLC layer, the stored data for RB configured for SDT including but not limited to RLC SDUs, RLC SDU segments and RLC PDUs. As for PDCP layer, the stored data for RB configured for SDT including but not limited to PDCU SDUs and PDUs.

In addition, the operation of discarding the stored data for RBs configured for SDT may be implemented by any suitable manner. In one example, the terminal device 210 may discard the stored data by performing a reestablishment procedure for the RBs configured for SDT at the layer 2 entity of the terminal device 210.

One example of the reestablishment procedure is RLC re-establishment procedure. Specifically, during the RLC re-establishment procedure, the terminal device 210 discards all RLC SDUs, RLC SDU segments, and RLC PDUs, if any; stops and resets all timers; and resets all state variables to their initial values.

Another example of the reestablishment procedure is PDCP re-establishment procedure. In some example embodiments, when upper layers request a PDCP entity re-establishment, the terminal device 210 sets TX_NEXT to the initial value for UM DRBs and SRBs and discards all stored PDCP SDUs and PDCP PDUs for SRBs.

In some example embodiments, the reestablishment procedure for the RBs configured for SDT is triggered/configured by the network device 220. In one example, IE reestablishPDCP may be used by the network device 220 to indicate to the terminal device 210 to perform a PDCH reestablishment procedure. In another example, IE reestablishRLC may be used by the network device 220 to indicate to the terminal device 210 to perform a PLC reestablishment procedure.

In another example embodiment, the terminal device 210 may discard the stored data by performing a procedure of discarding PDCP SDU. In some example embodiments, when the discardTimer expires for a PDCP SDU, or the successful delivery of a PDCP SDU is confirmed by PDCP status report, the transmitting PDCP entity shall discard the PDCP SDU along with the corresponding PDCP Data PDU. Further, if the corresponding PDCP Data PDU has already been submitted to lower layers, the discarding is indicated to lower layers. For SRBs, when upper layers request a PDCP SDU discard, the PDCP entity shall discard all stored PDCP SDUs and PDCP PDUs.

In some example embodiments, IE discardOnPDCP may be used by the network device 220 to indicate to the terminal device 210 that PDCP entity should discard stored SDUs and PDUs.

Further, operation of discarding the stored data may be perfumed at any suitable occasions before calculating data volume. As one example, the terminal device 210 discards the stored data for at least one RB configured for SDT if the terminal device receives 410 a message for suspending RRC connection (for example, RRC release message), where the message comprises information about the at least one RB configured for SDT.

As one specific example embodiment, if the terminal device 210 (i.e., UE) receives RRCRelease with suspend-Config, where there is at least one RB configured with SDT, the terminal device 210 discards all stored data (such as, PDCU SDUs and PDUs) for the RBs (including SRB(s) and DRB(s)) configured with SDT.

As another specific example embodiment, if the terminal device 210 (i.e., UE) receives RRCRelease with suspend-Config and there is at least one RB configured with SDT, the terminal device 210 discards all stored data (such as, RLC SDUs, RLC SDU segments, and RLC PDUs) for the RBs (including SRB(s) and DRB(s)) configured with SDT, especially for SRB and UM DRB configured with SDT.

Additionally, in some example embodiments, the message for suspending RRC connection may be used as an implicitly request of a PDCP SDU discard or PDCP re-establishment for the SRBs. That is, when the terminal device 210 receives the message for suspending RRC connection comprising an SDT configuration (such as, suspendConfig), the terminal device 210 may trigger/determine to discard the stored data. As one specific example, the terminal device 210 implicitly performs PDCP SDU discard procedure or PDCP re-establishment procedure. As another specific example, the terminal device 210 implicitly performs RLC re-establishment procedure for the RBs configured with SDT when receiving an RRC Release message comprising an SDT configuration (such as, suspendConfig).

Alternatively, in some example embodiments, the message for suspending RRC connection comprises an indication that indicates the stored data for the at least one RB configured for SDT is to be discarded. In other words, the operation of discarding the stored data may be configured/triggered by the network device 220. One example of the indication is information element (IE) discard on packet data convergence protocol (discardOnPDCP). Another example of the indication is IE reestablish packet data convergence protocol (reestablishPDCP). A further example of the indication is IE reestablish radio resource control (reestablishRLC). As one specific example, the network device 220 configures discardOnPDCP IE or reestablishPDCP IE for the RBs configured with SDT in an RRC Release message with suspendConfig. As another specific example, the network device 220 configures reestablishRLC IE for the RBs configured with SDT in an RRC Release message with suspendConfig.

In addition to discarding the stored data in response to receiving a message for suspending a RRC connection as discussed above. The terminal device 210 may discard the stored data if the terminal device 210 upon determines 420 all new data is from the RBs configured for SDT when the terminal device 210 is in an inactive state.

In some example embodiments, the terminal device 210 discards the stored data (such as, PDCP packets) for RBs configured for SDT during RRC Resume procedure before calculating the data volume for SDT. As one specific example, in the case that the terminal device 210 is in inactive state and all the new arriving data is from RBs configured with SDT, the terminal device 210 discards all stored data (such as, PDCU SDUs and PDUs) for the RBs (including SRB(s) and DRB(s)) configured with SDT. For example, the terminal device 210 implicitly performs PDCP SDU discard procedure or PDCP re-establishment procedure for the RBs before calculating data volume for SDT condition check.

In some example embodiments, the terminal device 210 discards the stored data (such as, RLC packets) for RBs configured for SDT during RRC Resume procedure before calculating the data volume for SDT. As one specific example, in the case that the terminal device 210 is in inactive state and all the new arriving data is from RBs configured with SDT, the terminal device 210 discards all stored data (such as, RLC SDUs, RLC SDU segments, and RLC PDUs) for the RBs (including SRB(s) and DRB(s)) configured with SDT, before data volume calculation for SDT condition check especially for SRB and UM DRB configured with SDT. For example, the terminal device 210 implicitly performs RLC re-establishment for the RBs configured with SDT before calculating data volume calculation for SDT condition check.

Figure 5A:
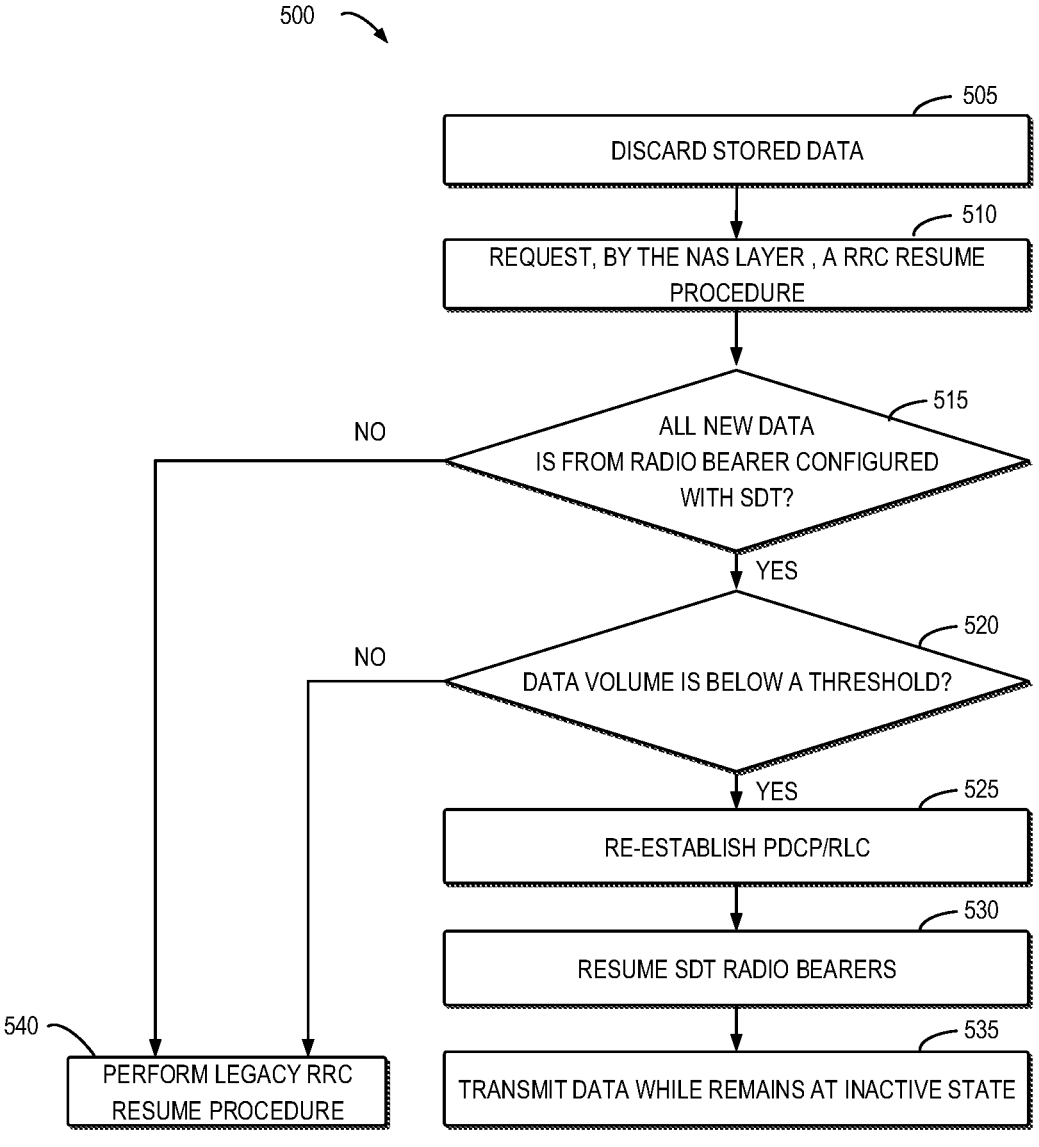
FIGS. 5A and 5B illustrate example methods for handling stored data according to some embodiments of the present disclosure.
Figure 5B:
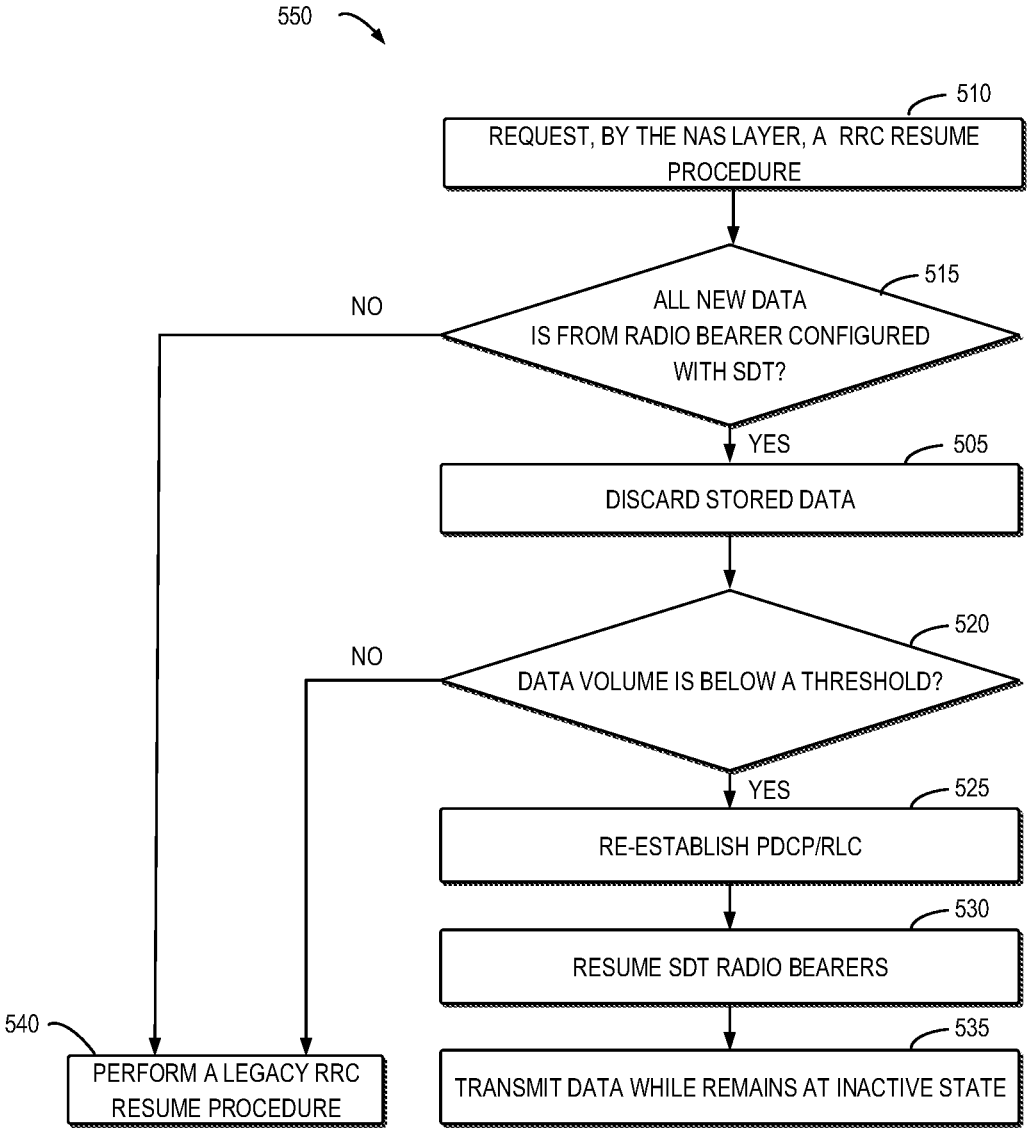

Merely for ease of understanding, reference is made to FIGS. 5A and 5B, which illustrate methods 500 and 550 for handling of stored data. In the specific example of FIG. 5A, the terminal device 210 discards stored data upon receiving a message for suspending the RRC connection. As illustrated in FIG. 5A, at block 505, the terminal device 210 discards stored data (such as, RLC SDUs, RLC SDU segments, RLC PDUs, PDCU SDUs and PDCP PDUs) in response to receiving a message for suspending a RRC connection (such as, a RRC release message) as discussed above. When there is new data needed to be transmitted to the network device 220, the NAS layer of the terminal device 210 transmits a request for resuming RRC connection to the access layer of the terminal device 210 at block 510.

At block 515, the terminal device 210 determines that whether all new data is from RB configured with SDT. If so, at block 520, the terminal device 210 will calculate the data volume for SDT and determines whether the calculated data volume is below a threshold. In the case that the calculated data volume is below a threshold, the terminal device 210 may trigger an SDT thereby. Specifically, the terminal device 210 performs PDCP/RLC re-establishment procedure at block 525, resumes RBs configured for SDT at block 530 and transmits data to the network device 220 while remains at inactive state at block 535. In the case that the terminal device 210 determines that at least part of the new data is from RB not configured with SDT or the calculated data volume exceeds the threshold, the process will proceed to block 540. At block 540, a legacy RRC resume procedure will be performed.

Reference is now made to FIG. 5B, where the terminal device 210 discards stored data upon determines that all new data is from the RBs configured for SDT when the terminal device 210 is in an inactive state. For example, the terminal device 210 discards stored data during RRC Resume procedure before calculating data volume. In FIGS. 5A and 5B, same operation/elements are labeled with same reference number. For brevity, same descriptions are omitted here.

As illustrated in FIG. 5B, the terminal device 210 discards stored data after the terminal device 210 determines that all new data is from the RBs configured for SDT. Further, as discussed above, the terminal device 210 may discard the stored data by performing a reestablishment procedure for the RBs configured for SDT at the layer 2 entity of the terminal device 210 or by performing a procedure of discarding PDCP SDU. If the terminal device 210 discards the stored data by performing a reestablishment procedure, the following reestablishment procedure (at block 525) may be omitted. Specifically, the operation at block 525 may be omitted by the terminal device 210.

Figure 6:
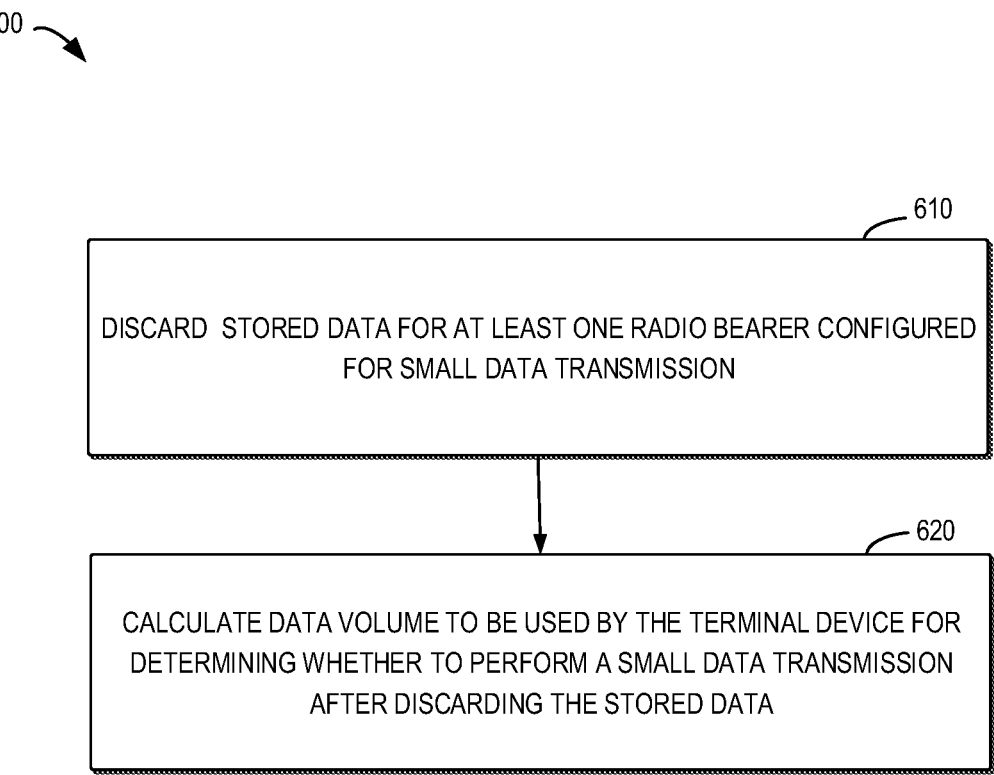
FIG. 6 illustrates an example method performed by a terminal device for handling stored data according to some embodiments of the present disclosure.

FIG. 6 illustrates a flowchart of an example method 600 in accordance with some embodiments of the present disclosure. For example, the method 600 can be implemented at the terminal device 210 as shown in FIG. 2.

At block 610, the terminal device 210 discards stored data for at least one RB configured for SDT.

At block 620, the terminal device 210 calculates data volume to be used by the terminal device 210 for determining whether to perform an SDT after discarding the stored data.

In some example embodiments, the terminal device 210 discards the stored data for at least one RB configured for SDT if, receives from a network device 220, a message for suspending radio resource control connection, the message comprising information about the at least one RB configured for SDT.

In some example embodiments, the terminal device 210 discards the stored data for at least one RB configured for SDT if determines all new data is from the at least one RB configured for SDT when the terminal device 210 is in an inactive state.

In some example embodiments, the message for suspending the radio resource control connection further comprises: an indication that indicates the stored data for the at least one RB configured for SDT is to be discarded.

In some example embodiments, the indication is an information element of one of the following: discard on packet data convergence protocol (discardOnPDCP), reestablish packet data convergence protocol (reestablishPDCP), or reestablish radio resource control (reestablishRLC).

In some example embodiments, the stored data to be discarded is stored at a layer 2 entity of the terminal device 210, and the layer 2 entity of the terminal device 210 is a RLC entity or a PDCP entity.

In some example embodiments, discarding the stored data for the at least one RB configured for SDT comprises performing, at the layer 2 entity of the terminal device 210, a reestablishment procedure for the at least one RB configured for SDT.

In some example embodiments, discarding the stored data for the at least one RB configured for SDT comprises performing a procedure of discarding PDCP SDU.

In some example embodiments, the stored data for the at least one RB comprises at least one of the following: at least one RLC SDU; at least one RLC SDU segment; at least one RLC PDU; at least one PDCP SDU; or at least one PDCP PDU.

In some example embodiments, the terminal device 210 comprises circuitry configured to discard stored data for at least one RB configured for SDT. The circuitry is further configured to calculate data volume to be used by the terminal device 210 for determining whether to perform an SDT after discarding the stored data.

In some example embodiments, the circuitry is further configured to discard the stored data for at least one RB configured for SDT if receives, from a network device 220, a message for suspending radio resource control connection, the message comprising information about the at least one RB configured for SDT.

In some example embodiments, the circuitry is further configured to discard the stored data for at least one RB configured for SDT if determines all new data is from the at least one RB configured for SDT when the terminal device 210 is in an inactive state.

In some example embodiments, the message for suspending the radio resource control connection further comprises: an indication that indicates the stored data for the at least one RB configured for SDT is to be discarded.

In some example embodiments, the indication is an information element of one of the following: discard on packet data convergence protocol (discardOnPDCP), reestablish packet data convergence protocol (reestablishPDCP), or reestablish radio resource control (reestablishRLC).

In some example embodiments, the stored data to be discarded is stored at a layer 2 entity of the terminal device 210, and the layer 2 entity of the terminal device 210 is a RLC entity or a PDCP entity.

In some example embodiments, the circuitry is further configured to perform, at the layer 2 entity of the terminal device 210, a reestablishment procedure for the at least one RB configured for SDT.

In some example embodiments, the circuitry is further configured to perform a procedure of discarding PDCP SDU.

In some example embodiments, the stored data for the at least one RB comprises at least one of the following: at least one RLC SDU at least one RLC SDU segment; at least one RLC PDU; at least one PDCP SDU; or at least one PDCP PDU.

FIG. 7 illustrates a flowchart of an example method 700 in accordance with some embodiments of the present disclosure. For example, the method 700 can be implemented at the network device 220 as shown in FIG. 2.

At block 710, the network device 220 transmits to a terminal device 210, a message for suspending radio resource control connection, the message comprising: information about at least one RB of the RBs, the at least one RB being configured by the network device 220 for SDT; and an indication that indicates the terminal device 210 to discard stored data for the at least one RB configured for SDT.

In some example embodiments, the network device 220 comprises circuitry configured to transmit to a terminal device 210, a message for suspending radio resource control connection, the message comprising: information about at least one RB of the RBs, the at least one RB being configured by the network device 220 for SDT; and an indication that indicates the terminal device 210 to discard stored data for the at least one RB configured for SDT.

Example Embodiments for Obtaining Volume of New Data

As discussed above, the volume of the new data should be considered when calculating the data volume for SDT. Therefore, it is expected that the terminal device 210 may obtain information about volume of new data before calculating data volume for SDT.

In accordance with some example embodiments of the present disclosure, there is provided a solution for communication. In this solution, the terminal device 210 obtains information about volume of new data needed to be transmitted to a network device 220, where the information is provided from a layer of the terminal device 210 higher than the PDCP layer to a layer of the terminal device responsible for calculating data volume to be used by the terminal device for determining whether to perform an SDT. Then, if all the new data are from at least one RB configured for SDT, the terminal device 210 calculates the data volume at least in part based on the information. In this way, the terminal device 210 may obtain information about volume of new data before calculating data volume for SDT.

Figure 8:
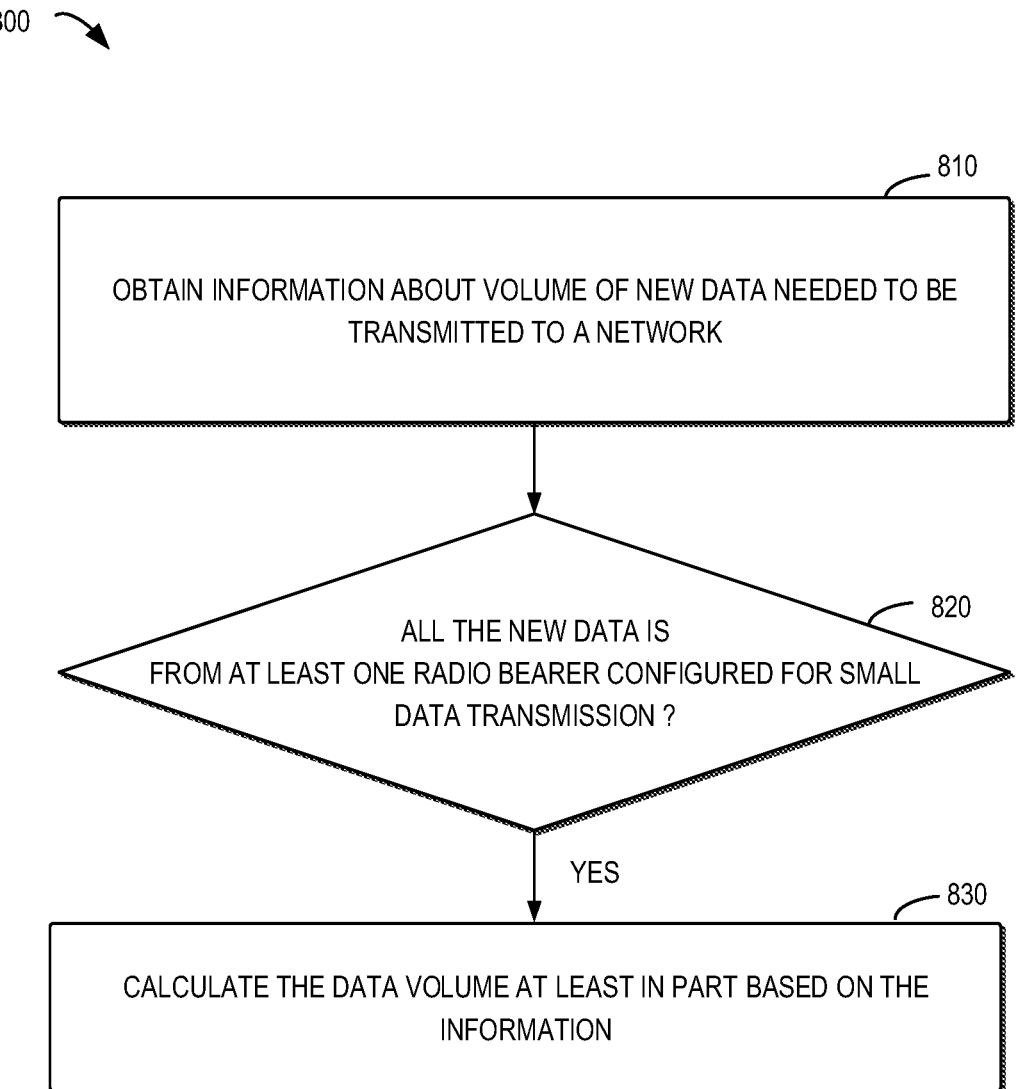
FIG. 8 illustrates an example method performed by a terminal device for obtaining the volume of new data according to some embodiments of the present disclosure.

Reference is made to FIG. 8, which illustrates example method 800 performed by the terminal device 210 for obtaining volume of new data.

At block 810, the terminal device 210 obtains information about volume of new data needed to be transmitted to a network. Specifically, the information is provided from a layer of the terminal device 210 higher than the PDCP layer to a layer of the terminal device 210 responsible for calculating data volume to be used by the terminal device 210 for determining whether to perform an SDT. In this way, although the RBs configured for SDT are suspended, the layer responsible for the data volume can obtain information about volume of new data.

Further, one example of the layer higher than the PDCP layer is an SDAP layer. In some example embodiments, assuming the new packets can be seen for SDAP layer, the SDAP layer/entity provides information about data volume to the layer responsible for calculating the data volume (such as, a lower layers (MAC) or high layers (RRC).) Further, the terminal device 210 shall consider the following as SDAP data volume: SDAP SDUs, SDAP PDUs and SDAP Control PDUs.

Another example of the layer higher than the PDCP layer is upper layer (for example, NAS). In some example embodiments, the NAS layer/entity provides data volume of the new arriving data to the layer responsible for calculating the data volume (such as, a lower layers (MAC)).

At block 820, the terminal device 210 determines if all the new data is from at least one RB configured for SDT. If so, the terminal device 210 calculates the data volume at least in part based on the information at block 830. In other words, in addition to the factors of PDCP data volume and RLC data volume, the terminal device 210 calculates (by such as MAC layer or RRC layer) the data volume for SDT condition checking also need to take the SDAP data volume or higher layer data volume into account for the RBs configured with SDT.

One example of the layer responsible for calculating the data volume is MAC layer. Another example of the layer responsible for calculating the data volume is RRC layer.

In some example embodiments, the terminal device 210 only calculates data volume of RBs configured with SDT for SDT condition check.

Figure 9:
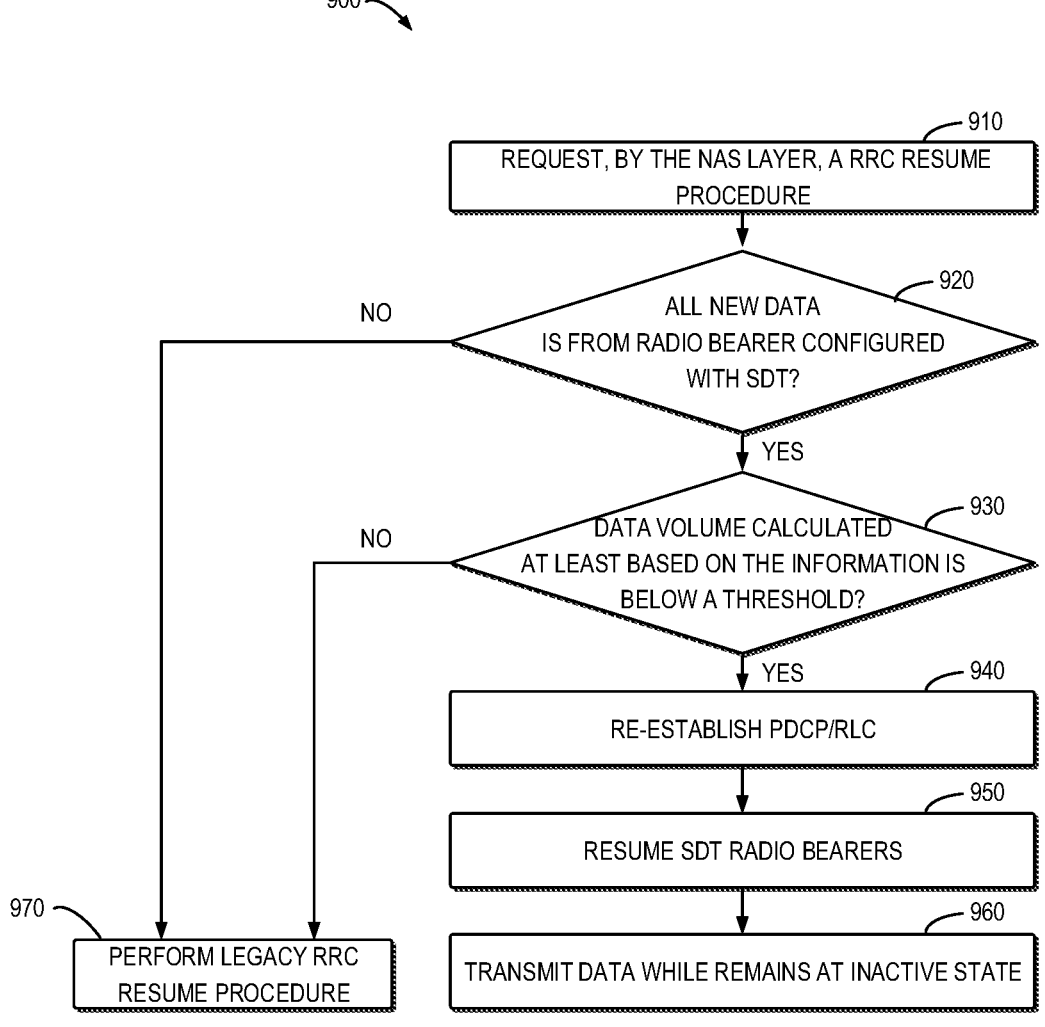
FIG. 9 illustrates an example method for obtaining the volume of new data according to some embodiments of the present disclosure.

Merely for ease of understanding, reference is made to FIG. 9, which illustrates method 900 for obtaining volume of new data. As illustrated in FIG. 9, when there is new data needed to be transmitted to the network device 220, the NAS of the terminal device 210 transmits a request for resuming RRC connection to the access layer of the terminal device 210 at block 910. Further, as discussed above, the NAS of the terminal device 210 may provide information about the volume of new data. In this event, the information about volume may be provided together with a RRC resume request.

At block 920, the terminal device 210 determines that whether all new data is from RB configured with SDT. If so, at block 930, the terminal device 210 will calculates the data volume for SDT and determines whether the calculated data volume is below a threshold. In the specific example of FIG. 9, the terminal device 210 calculates the data volume at least in part based on the information about the volume of new data. As discussed above, the volume of new data may be provided by a layer higher than the PDCP layer (such as, a NAS or SDAP layer) at any suitable occasions in any suitable manner.

In case that the calculated data volume is below a threshold, the terminal device 210 may trigger an SDT thereby. Specifically, the terminal device 210 performs PDCP/RLC re-establishment procedure at block 940, resumes RBs configured for SDT at block 950 and transmits data to the network device 220 while remains at inactive state at block 960. In case the terminal device 210 determines that at least part of the new data is from RB not configured with SDT or the calculated data volume exceeds the threshold, the process will proceed to block 970. At block 970, a legacy RRC Resume procedure will be performed.

In some example embodiments, the terminal device 210 comprises circuitry configured to transmit to obtain information about volume of new data needed to be transmitted to a network device 220, where the information is provided from a layer of the terminal device 210 higher than the PDCP layer to a layer of the terminal device responsible for calculating data volume to be used by the terminal device 210 for determining whether to perform an SDT. The circuitry is further configured to calculate the data volume at least in part based on the information if all the new data are from at least one RB configured for SDT.

In some example embodiments, the layer responsible for calculating the data volume is a medium access control layer or radio resource control layer.

In some example embodiments, the layer higher than the PDCP layer is a non-access stratum or a service data adaptation protocol layer.

Example Embodiments for Resuming RS(s) in Advance

As discussed above, in the conventional proposed solution for calculating volume data for SDT as illustrated in FIG. 3, the operation of calculating the data volume for SDT is performed prior to performing RB resume procedure, which means when calculating the data volume for SDT, the new data has not been delivered to the layer responsible for calculating the data volume for SDT.

In accordance with some example embodiments of the present disclosure, there is provided a solution for communication. In this solution, the terminal device 210 in the inactive state resumes at least one RB configured for SDT if the terminal device 210 detects all the new data is from the RBs configured for SDT. Then, the terminal device 210 calculates data volume to be used by the terminal device 210 for determining whether to perform an SDT. In this way, when calculating the data volume for SDT, the new data has been delivered to the layer responsible for calculating the data volume for SDT, which makes handling for new data properly.

Reference is made to FIG. 10, which illustrates example method 1000 performed by the terminal device 210 for resuming RS(s) in advance.

At block 1010, the terminal device 210 in the inactive state resumes at least one RB configured for SDT if the terminal device 210 detects all the new data is from the RBs configured for SDT.

At block 1020, the terminal device 210 calculates data volume to be used by the terminal device 210 for determining whether to perform an SDT.

In addition, in some example embodiments, if the terminal device 210 determines not to perform an SDT, the terminal device 210 suspends the previously resumed RBs.

As one specific example embodiments, if all the new arriving data is from RBs configured with SDT, the terminal device 210 resumes the RBs configured with SDT before data volume calculation for SDT condition check. After the RBs configured with SDT are resumed, the SDAP layer will process and forward data to PDCP layer, and thus the new arriving data will be considered as PDCP PDU. In the following, if the terminal device 210 determines that the SDT condition is not fulfilled, the terminal device 210 will suspend the RBs configured with SDT. Else, the terminal device 210 performs an SDT with the network device 220.

Figure 11:
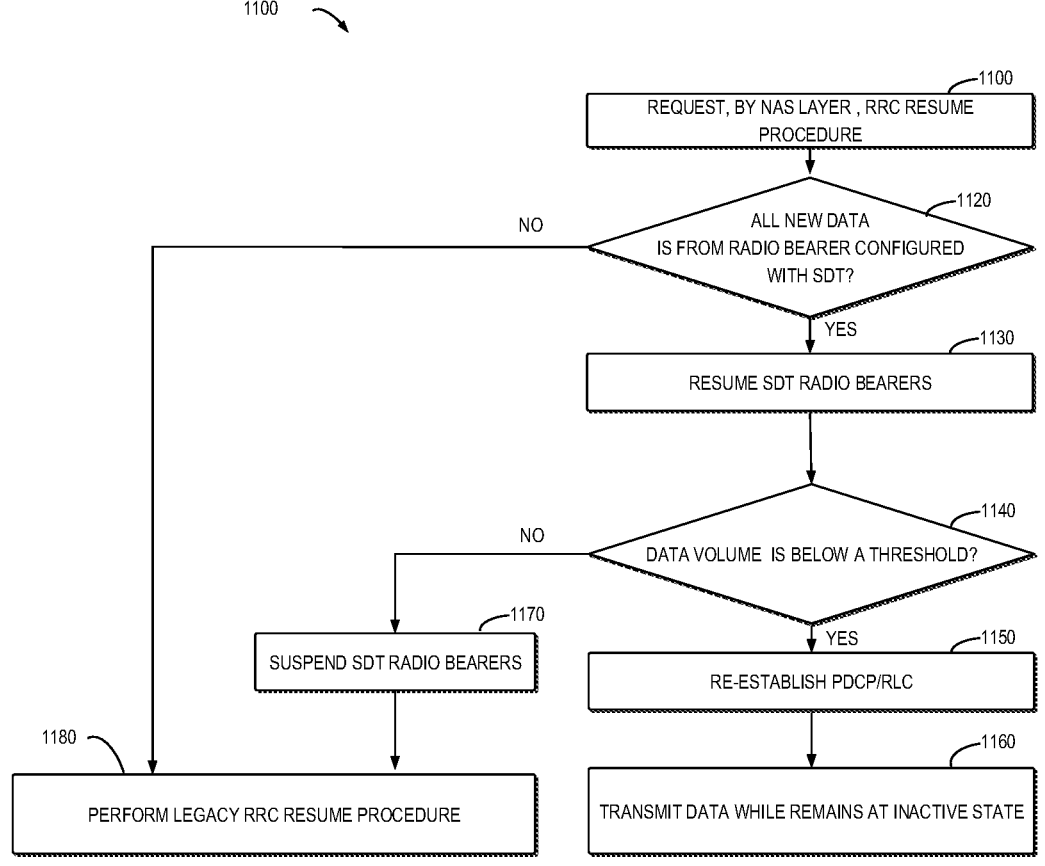
FIG. 11 illustrates an example method performed by a terminal device for resuming RS(s) in advance according to some embodiments of the present disclosure.

Merely for ease of understanding, reference is made to FIG. 11 which illustrates method 1100 for resuming RS(s) in advance. As illustrated in FIG. 11, when there is new data needed to be transmitted to the network device 220, the NAS of the terminal device 210 transmits a request for resuming RRC connection to the access layer of the terminal device 210 at block 1110.

At block 1120, the terminal device 210 determines that whether all new data is from RB configured with SDT. If so, the terminal resumes the RBs configured for SDT at block 1130. As a result, the new data may be delivered to the layer responsible for calculating the data volume for SDT. At block 1140, the terminal device 210 will calculate the data volume for SDT and determines whether the calculated data volume is below a threshold.

In the case that the calculated data volume is below a threshold, the terminal device 210 may trigger an SDT thereby. Specifically, the terminal device 210 performs PDCP/RLC re-establishment procedure at block 1150 and transmits data to the network device 220 while remains at inactive state at block 1160. Else, if the calculated data volume exceeds the threshold, the process will proceed to block 1170. At block 1170, the terminal device 210 suspends the RBs configured for SDT and then performs a legacy RRC resume procedure at block 1180.

Further, as illustrated in FIG. 11, in case the terminal device 210 determines that at least part of the new data is from RB not configured with SDT, the terminal device 210 will also proceed to block 1180 to perform a legacy RRC resume procedure.

In some example embodiments, the terminal device 210 comprises circuitry configured to resumes at least one RB configured for SDT if the terminal device 210 detects all the new data is from the at least one RB. The circuitry is further configured to calculate data volume to be used by the terminal device 210 for determining whether to perform an SDT.

In some example embodiments, the circuitry is further configured to suspend the at least one radio bearer configured for small data transmission in accordance to a determination of not performing a small data transmission.

Example Processes for Handling BSR

As discussed above, in the case that the SDT data cannot be transmitted within the first/original SDT, or there are still remaining SDT need to be transmitted. The terminal device 210 will transmit a BSR to the network device 220. Therefore, it is expected that the reported BSR should indicate an actual state of the remaining SDT data.

Generally speaking, there are multiple logical channels in the communication system, and the multiple logical channels are divided into a plurality of logical channel groups. When reporting BSR, the terminal device 210 report the BSR for respective logical channel group. Further, each RB may correspond to one or more logical channels.

As for a terminal device performing SDT, there may be stored data at both the RBs configured with SDT (which will be non-suspended during SDP procedure) and the RBs not configured with SDT (which will be suspended during SDP procedure). In conventional solution for handling BSR, the terminal device (such as, a MAC layer of the terminal device) may take both suspended RBs and non-suspended RBs into BSR calculation. If the terminal device generates the BSR with the conventional solution, the network device 220 is unable to obtain the actual state of the remaining SDT data. For example, if the non-SDT RB(s) and SDT RB(s) are in the same logical channel group, it may results in very big data volume reported to the network device 220. In the event, the network device 220 will be very confused about whether the subsequent SDT can be performed.

Example Embodiments for Handling BSR at the Terminal Device

As discussed above, it is expected that the terminal device 210 (such as, the MAC layer of the terminal device 210)

shall not consider RBs not configured with SDT for BSR calculation during an SDT procedure.

In accordance with some example embodiments of the present disclosure, there is provided a solution for communication. In this solution, when the terminal device 210 is performing an SDT, the terminal device 210 (such as, the MAC layer of the terminal device 210) shall not consider RBs not configured with SDT for BSR calculation. In this way, the network device 220 can have correct buffer size information of the SDT data to make a proper decision whether the subsequent transmission can be performed.

Figure 12:
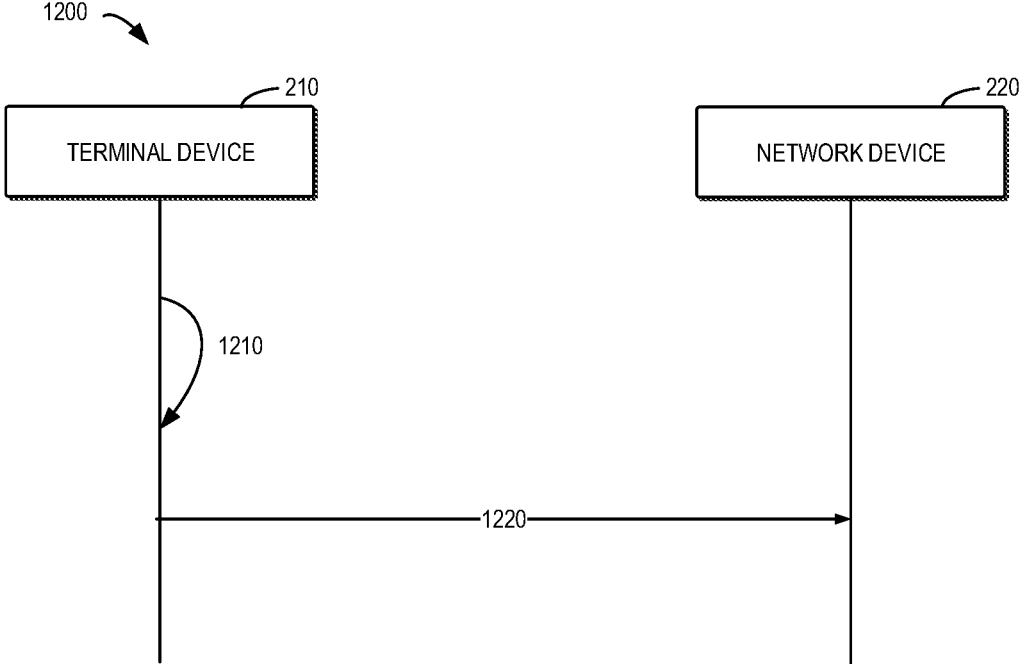
FIG. 12 illustrates a signaling chart for handling buffer status report (BSR) according to some embodiments of the present disclosure.

Reference is now made to FIG. 12, which shows a signaling flow 1200 for handling BSR according to some embodiments of the present disclosure. For the purpose of discussion, the signaling flow 1200 will be described with reference to FIG. 2. The signaling flow 1200 may involve a network device 220 and a terminal device 210.

In operation, the terminal device 210 generates 1210 a BSR indicating a buffer status during the SDT. Further, the BSR is associated with specific RB (s) or logical channel.

In some example embodiments, the BSR is associated with the RB(s) being configured for SDT. Alternatively, or in addition, in some example embodiments, the BSR is associated with the BR(s) being non-suspended. Alternatively, or in addition, in some example embodiments, the BSR is associated with the logical channels corresponding to the RB(s) being configured for SDT. Alternatively, or in addition, in some example embodiments, the BSR is associated with the logical channels corresponding to the RS(s) being non-suspended.

As one specific example, when performing SDT, the terminal device 210 (such as, the MAC layer of the terminal device 210) shall not take the logical channels corresponding to suspended RBs (i.e., RBs not configured with SDT) into consideration for BSR calculation. In other words, during SDT, the terminal device 210 (such as, the MAC layer of the terminal device 210) shall only take the CCCH and logical channels corresponding to RBs which are not suspended (i.e., RBs configured with SDT) into consideration for BSR calculation during SDT.

In addition, as discussed above, if the non-SDT RB(s) and SDT RB(s) are in the same logical channel group, the network device 210 will be very confused about whether subsequent SDT can be performed or not. Therefore, improved operation may be operated on such logical channel group.

In some example embodiments, if a logical channel group comprises at least one logical channel corresponding to RBs being suspended and at least one further logical channel corresponding to RBs being non-suspended, the terminal device 210 generates the BSR without considering the RB(s) not being configured for SDT.

In some example embodiments, the terminal device 210 generates a BSR for a plurality of logical channel groups. Further, the terminal device may use a plurality of buffer size fields to indicate the buffer status of respective logical channel groups. As for the logical channel group comprises at least one logical channel corresponding to RBs being suspended and at least one further logical channel corresponding to RBs being non-suspended, the respective buffer size is calculated without considering the RB(s) not being configured for SDT (i.e., being suspended).

In some other example embodiments, if a logical channel group comprises at least one logical channel corresponding to RBs being suspended and at least one further logical channel corresponding to RBs being non-suspended, the terminal device 210 may generate the BSR considering both the RS(s) being non-suspended (i.e., SDT RB(s)) and the RS(s) being suspended (i.e., non SDT RB(s)). In this event, the network device 220 may consider the reported BSR indicating SDT data if the value of the reported BSR is below a threshold.

Alternatively, or in addition, in some example embodiments, if a logical channel group comprises at least one logical channel corresponding to RBs being suspended and at least one further logical channel corresponding to RBs being non-suspended, the terminal device 210 generates the BSR without considering the RB(s) being suspended.

Alternatively, or in addition, in some example embodiments, if a logical channel group comprises at least one logical channel corresponding to RBs being suspended and at least one further logical channel corresponding to RBs being non-suspended, the terminal device 210 generates the BSR without considering the logical channels corresponding to the RB(s) not being configured for SDT.

Alternatively, or in addition, in some example embodiments, if a logical channel group comprises at least one logical channel corresponding to RBs being suspended and at least one further logical channel corresponding to RBs being non-suspended, the terminal device 210 generates the BSR without considering the logical channels corresponding to the RB(s) being suspended In some example embodiments, if each logical channel comprised in the logical channel group corresponds to RB being suspended, the terminal device 210 may or may not transmit the BSR for the logical channel group, because the network device 220 will not be confused about such BSR.

As one specific example, when performing SDT, for one logical channel group, if the logical channel group includes both logical channel of SDT RBs (not suspended RBs) and logical channel of non-SDT RBs (suspended), the terminal device 210 doesn't take the logical channels of suspended RBs into BSR for the logical channel group.

In some example embodiments, for the purpose of MAC buffer status reporting, the transmitting PDCP entity shall consider the following as PDCP data volume: the PDCP SDUs for which no PDCP Data PDUs have been constructed; the PDCP Data PDUs that have not been submitted to lower layers; the PDCP Control PDUs; for AM DRBs, the PDCP SDUs to be retransmitted; and for AM DRBs, the PDCP Data PDUs to be retransmitted.

In some example embodiments, for the purpose of MAC buffer status reporting, the UE shall consider the following as RLC data volume: RLC SDUs and RLC SDU segments that have not yet been included in an RLC data PDU; RLC data PDUs that are pending for initial transmission; RLC data PDUs that are pending for retransmission (RLC AM).

In addition, in some example embodiments, if a status PDU has been triggered and t-StatusProhibit is not running or has expired, the UE shall estimate the size of the status PDU that will be transmitted in the next transmission opportunity, and consider this as part of RLC data volume.

After generating the BSR, the terminal device 210 transmits 1220 the BSR to the network device 220.

Figure 13:
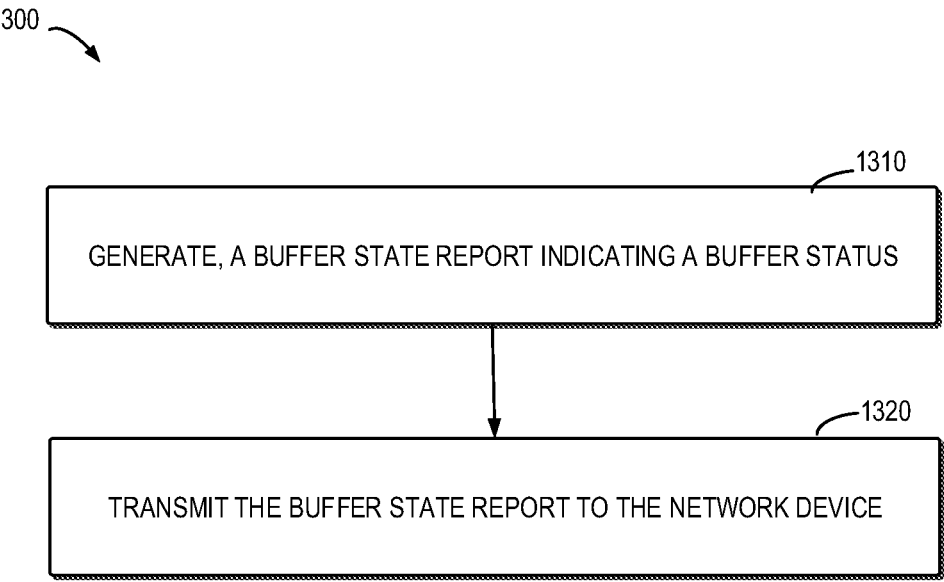
FIG. 13 illustrates an example method for handling BSR according to some embodiments of the present disclosure.

FIG. 13 illustrates a flowchart of an example method 1300 in accordance with some embodiments of the present disclosure. For example, the method 1300 can be implemented at the terminal device 210 as shown in FIG. 2.

At block 1310, the terminal device 210 being performing an SDT with a network device 220 generates a BSR indicating a buffer status associated with at least one of the following: RBs being configured for SDT, RBs being non-suspended, logical channels corresponding to the RBs being configured for SDT, or logical channels corresponding to the RBs being non-suspended.

At block 1320, the terminal device 210 transmits the BSR to the network device 220.

In some example embodiments, the terminal device 210 comprises circuitry configured to generate a BSR indicating a buffer status associated with at least one of the following: RBs being configured for SDT, RBs being non-suspended, logical channels corresponding to the RBs being configured for SDT, or logical channels corresponding to the RBs being non-suspended. The circuitry further configured to transmits the BSR to the network device 220.

Figure 14:
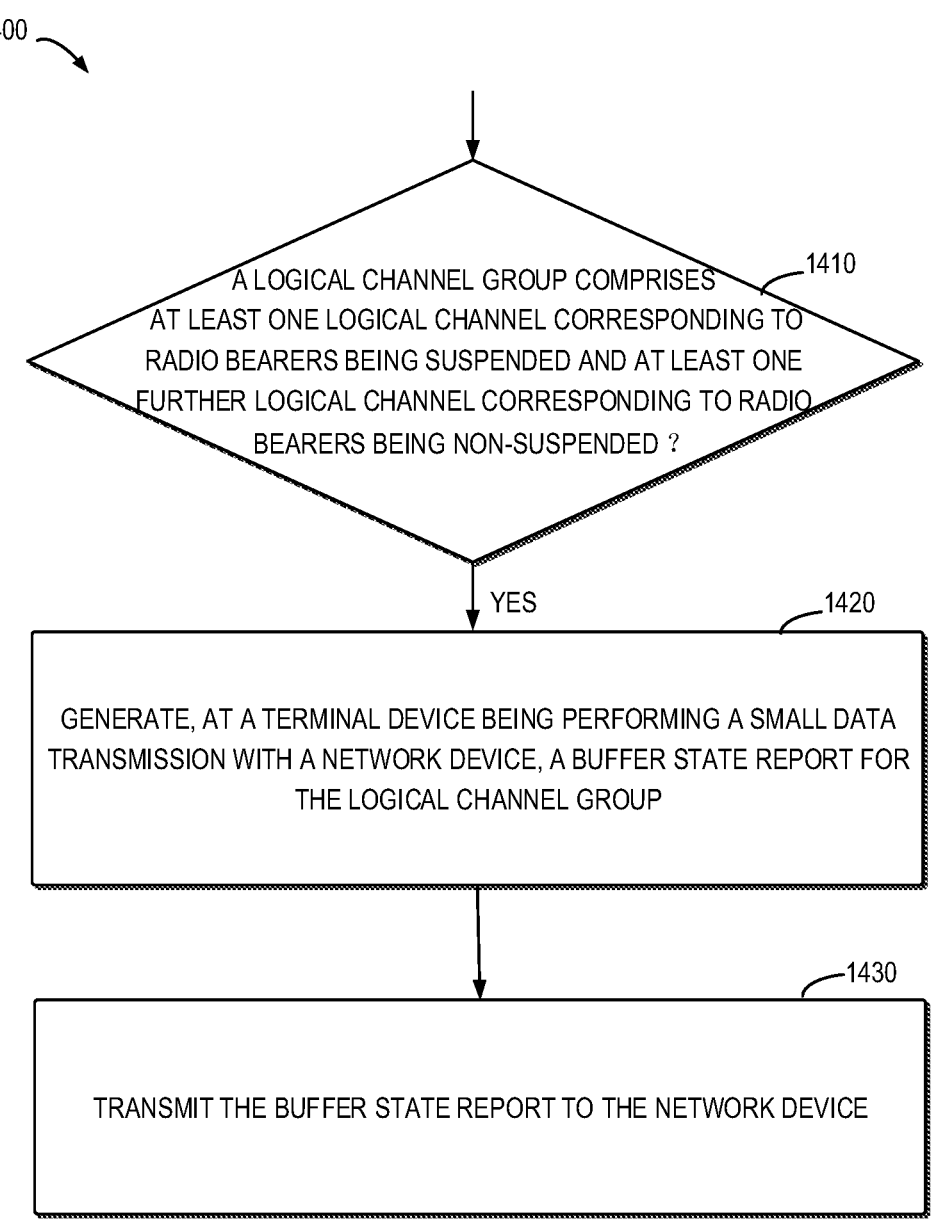
FIG. 14 illustrates another example method for handling BSR according to some embodiments of the present disclosure.

FIG. 14 illustrates a flowchart of an example method 1400 in accordance with some embodiments of the present disclosure. For example, the method 1400 can be implemented at the terminal device 210 as shown in FIG. 2.

At block 1410, the terminal device 210 determines that if a logical channel group comprises at least one logical channel corresponding to RBs being suspended and at least one further logical channel corresponding to RBs being non-suspended.

If so, at block 1420, the terminal device 210 being performing an SDT with a network device 220 generates a BSR for the logical channel group without considering at least one of the following: RBs not being configured for SDT, RBs being suspended, logical channels corresponding to the RBs not being configured for SDT, or logical channels corresponding to the RBs being suspended. At block 1430, the terminal device 210 transmits the BSR to the network device 220.

In some example embodiments, the terminal device 210 comprises circuitry configured to: if a logical channel group comprises at least one logical channel corresponding to RBs being suspended and at least one further logical channel corresponding to RBs being non-suspended, the terminal device 210 being performing an SDT with a network device 220 generate a BSR for the logical channel group without considering at least one of the following: RBs not being configured for SDT, RBs being suspended, logical channels corresponding to the RBs not being configured for SDT, or logical channels corresponding to the RBs being suspended. The circuitry further configured to transmits the BSR to the network device 220.

Example Embodiments for Handling BSR at the Network Device

As discussed above, if the non-SDT RB(s) and SDT RB(s) are in the same logical channel group, the network device will be very confused about whether subsequent SDT can be performed or not.

In accordance with some example embodiments of the present disclosure, there is provided a solution for communication. In this solution, the network device 220 configures logical channels of SDT RB (s) and logical channels of non-SDT RB(s) (i.e., not configured for SDT) into separate logical channel groups. In this way, when reporting BSR for SDT, no additional operation is needed at the terminal device 210.

FIG. 15 illustrates a flowchart of an example method 1500 in accordance with some embodiments of the present disclosure. For example, the method 1500 can be implemented at the network device 220 as shown in FIG. 2.

At block 1510, the network device 220 configures at least one RB for SDT, the at least one RB corresponding to a plurality of logical channels comprised in at least one logical channel group, each logical channel comprised in the at least one logical channel group corresponding to a RB configured for SDT.

At block 1520, the network device 220 indicates the configured result to a terminal device 210.

The network device 220 may indicate the configured result to a terminal device 210 by any suitable message. One example message is a RRC release message. Another example message is a RRC configuration message. A further example message is a RRC re-configuration message.

In some example embodiments, the network device 220 comprises circuitry configured to configures at least one RB for SDT, the at least one RB corresponding to a plurality of logical channels comprised in at least one logical channel group, each logical channel comprised in the at least one logical channel group corresponding to a RB configured for SDT. The circuitry further configured to indicates the configured result to a terminal device 210.

In some example embodiments, the circuitry further configured to transmits the configured result to the terminal device 210 via one of the following: a radio resource control release message, a radio resource control configuration message, or a radio resource control re-configuration message.

Example Processes for Falling Back to 4-Step RA SDT

Currently, parameter msgA-TransMax is used to enable a falling back from 2-step RA procedure for non-SDT to 4-step RA procedure for non-SDT. Parameter msgA-TransMax refers to the maximum number of MSGA transmissions when both 4-step and 2-step RA resources are configured. Specifically, for 2-step RA procedure, if a maximum number is configured (i.e. msgA-TransMax is configured), and if the 2-step RA procedure is not successfully completed even after transmitting the message A msgA-TransMax times, the terminal device fallbacks to 4-step RA procedure (i.e., the terminal device perform RA resource selection procedure for 4-step RA).

As discussed above, it has reached an agreement that both 2-step RA based SDT and 4-step RA based SDT are supported. In this event, it is expected that if the terminal device fails to transmit SDT data via 4-step RA procedure, the terminal device may fall back to 4-step RA SDT.

However, the resource for RA for non-SDT or RA for SDT is different, which means that the current parameter msgA-TransMax cannot be reused for RA-based SDT.

In accordance with some example embodiments of the present disclosure, there is provided a solution for communication. In this solution, one parameter (may be referred to as msgA-TransMaxSDT) is configured for RA-based SDT specifically. In this way, the terminal device 210 may falling back from 2-step RA based SDT to 4-step RA based SDT properly.

Figure 16:
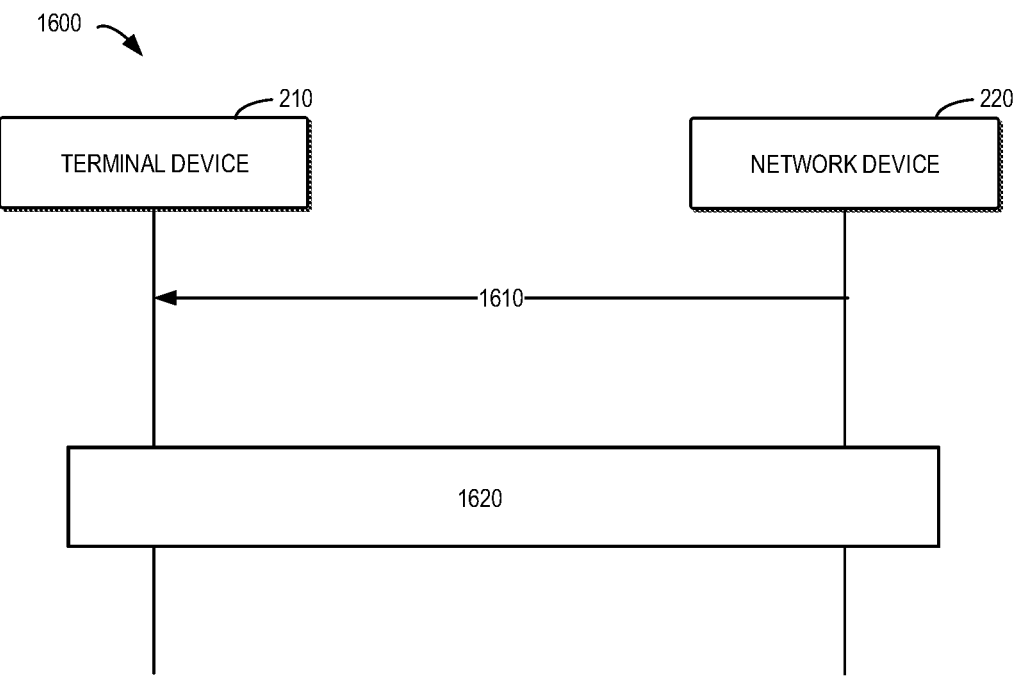
FIG. 16 is a signaling chart illustrating a process for falling back to 4-step random access (RA) based SDT procedure according to some embodiments of the present disclosure.

Reference is now made to FIG. 16, which shows a signaling flow 1600 for handling BSR according to some embodiments of the present disclosure. For the purpose of discussion, the signaling flow 1600 will be described with reference to FIG. 2. The signaling flow 1600 may involve a network device 220 and a terminal device 210.

In some example embodiments, to support fallback from 2-step RA-SDT to 4-step RA-SDT, the network device 220 can configure one parameter (such as, msgA-TransMaxSDT) e.g. for SDT specifically. Parameter msgA-TransMaxSDT is the maximum number of MSG A transmission when both 4-step RA Resource for SDT and 2-step RA type RA Resource for SDT are configured.

In operation, the terminal device 210 receives, a parameter (such as, msgA-TransMaxSDT) indicating a maximum number for transmitting a message A of 2-step RA procedure for SDT by the terminal device 210 when the terminal device 210 is configured with both of 4-step RA procedure resources for SDT and 2-step RA procedure resources for SDT Then, the terminal device 210 performs 1220 an SDT with the network device 220 based on the maximum number.

In some example embodiments, if the number of failing to transmitting a message A of 2-step RA procedure for the SDT exceeds the maximum number, performing the SDT by falling back to performing a 4-step RA procedure for the SDT, the 4-step RA procedure reusing the same preamble group configured for the 2-step RA procedure.

As one specific example, the while the terminal device 210 is performing 2-step RA SDT, if msgA-TransMaxSDT is configured, and if the RA procedure for SDT is not successfully completed even after transmitting the message msgA-TransMaxSDT times, UE fallbacks to perform 4-step RACH based SDT using the same preamble group as in 2-step RA SDT.

FIG. 17 illustrates a flowchart of an example method 1700 in accordance with some embodiments of the present disclosure. For example, the method 1700 can be implemented at the terminal device 210 as shown in FIG. 2.

At block 1710, the terminal device 210 receives, from a network device 220, a parameter indicating a maximum number for transmitting a message A of 2-step RA procedure for SDT by the terminal device 210 when the terminal device 210 is configured with both of 4-step RA procedure resources for SDT and 2-step RA procedure resources for SDT.

At block 1720, the terminal device 210 performs an SDT with the network device 220 based on the maximum number.

In some example embodiments, the terminal device 210 performs the SDT by falling back to performing a 4-step RA procedure for the SDT, the 4-step RA procedure reusing the same preamble group configured for the 2-step step RA procedure, if the number of failing to transmitting a message A of 2-step RA procedure for the SDT exceeds the maximum number.

In some example embodiments, the terminal device 210 comprises circuitry configured to receives, from a network device 220, a parameter indicating a maximum number for transmitting a message A of 2-step RA procedure for SDT by the terminal device 210 when the terminal device 210 is configured with both of 4-step RA procedure resources for SDT and 2-step RA procedure resources for SDT. The circuitry further configured to perform an SDT with the network device 220 based on the maximum number.

In some example embodiments, the circuitry further configured to perform the SDT by falling back to performing a 4-step RA procedure for the SDT, the 4-step RA procedure reusing the same preamble group configured for the 2-step step RA procedure, if the number of failing to transmitting a message A of 2-step RA procedure for the SDT exceeds the maximum number.

Figure 18:
FIG. 18 illustrates an example method for falling back to 4-step RA based SDT procedure performed by a network device according to some embodiments of the present disclosure.

FIG. 18 illustrates a flowchart of an example method 1800 in accordance with some embodiments of the present disclosure. For example, the method 1800 can be implemented at the network device 220 as shown in FIG. 2.

At block 1810, the network device 220 transmits, to a terminal device 210, a parameter indicating a maximum number for transmitting message A of 2-step RA procedure for SDT by the terminal device 210 when the terminal device 210 is configured with both 4-step RA procedure resources for SDT and 2-step RA procedure resources for SDT.

In some example embodiments, the network device 220 comprises circuitry configured to transmit, to a terminal device 210, a parameter indicating a maximum number for transmitting message A of 2-step RA procedure for SDT by the terminal device 210 when the terminal device 210 is configured with both 4-step RA procedure resources for SDT and 2-step RA procedure resources for SDT.

Example Devices

Figure 19:
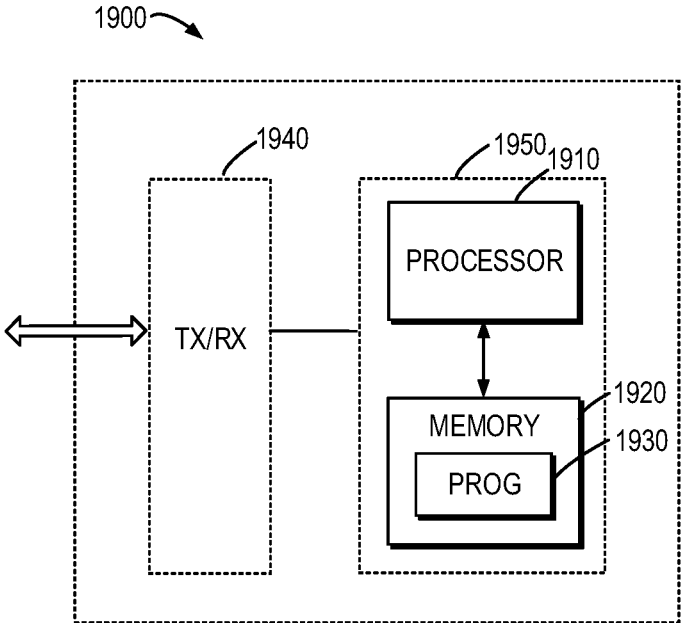
FIG. 19 illustrates a simplified block diagram of an apparatus that is suitable for implementing example embodiments of the present disclosure.

FIG. 19 is a simplified block diagram of a device 1900 that is suitable for implementing embodiments of the present disclosure. The device 1900 can be considered as a further example implementation of the terminal device 210 and the network device 220 as shown in FIG. 2. Accordingly, the device 1900 can be implemented at or as at least a part of the terminal device 210, the network device 220.

As shown, the device 1900 includes a processor 1910, a memory 1920 coupled to the processor 1910, a suitable transmitter (TX) and receiver (RX) 1940 coupled to the processor 1910, and a communication interface coupled to the TX/RX 1940. The memory 1910 stores at least a part of a program 1930. The TX/RX 1940 is for bidirectional communications. The TX/RX 1940 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1930 is assumed to include program instructions that, when executed by the associated processor 1910, enable the device 1900 to operate in accordance with the embodiments of the present disclosure, as discussed herein with reference to FIGS. 2 and 4-18. The embodiments herein may be implemented by computer software executable by the processor 1910 of the device 1900, or by hardware, or by a combination of software and hardware. The processor 1910 may be configured to implement various embodiments of the present disclosure. Furthermore, a combination of the processor 1910 and memory 1910 may form processing means 1950 adapted to implement various embodiments of the present disclosure.

The memory 1910 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1910 is shown in the device 1900, there may be several physically distinct memory modules in the device 1900. The processor 1910 may be of any type suitable to the local technical network, and may include one or more of general purpose computers, special purpose computers, microprocessors, digital signal processors (DSPs) and processors based on multicore processor architecture, as non-limiting examples. The device 1900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 and 4-18. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a User Equipment (UE), the method comprising:
    receiving, from a network, a Radio Resource Control (RRC) Release message;
    triggering a Packet Data Convergence Protocol (PDCP) entity to perform Service Data Unit (SDU) discard for a Signalling Radio Bearer (SRB) in a case where the RRC Release message is received and a Small Data Transmission (SDT) configuration is included in the RRC Release message; and
    determining, after the SDU discard is performed, whether a data volume of pending uplink data for an SDT procedure is less than or equal to a data volume threshold.

2. The method according to claim 1, further comprising:
    re-establishing a Radio Link Control (RLC) entity for an RLC bearer in the case where the RRC Release message is received and the SDT configuration is included in the RRC Release message.

3. The method according to claim 2, comprising:
    calculating, after the RLC entity is re-established and the SDU discard is performed, the data volume of pending uplink data for the SDT procedure.

4. The method according to claim 2, comprising:
    determining, after the RLC entity is re-established and the SDU discard is performed, whether the data volume of pending uplink data for the SDT procedure is less than or equal to the data volume threshold.

5. The method according to claim 1, further comprising:
    initiating the SDT procedure in the case where the RRC Release message is received and the SDT configuration is included in the RRC Release message.

6. The method according to claim 1, further comprising:
    initiating the SDT procedure in a case where:
        the RRC Release message is received and the SDT configuration is included in the RRC Release message, and
        the data volume is less than or equal to the data volume threshold.

7. A method of a Radio Access Network (RAN) node, the method comprising:

sending, to a User Equipment (UE), a Radio Resource Control (RRC) Release message with a Small Data Transmission (SDT) configuration, wherein the SDT configuration is configured to cause the UE to trigger a Packet Data Convergence Protocol (PDCP) entity to perform Service Data Unit (SDU) discard for a Signalling Radio Bearer (SRB); and receiving, from the UE, an RRC Resume message and uplink SDT data, wherein whether a data volume of the pending uplink data for an SDT procedure is less than or equal to a data volume threshold is determined, after the SDU discard is performed.

8. The method according to claim 7, wherein the SDT configuration is configured to cause the UE to re-establish a Radio Link Control (RLC) entity for a RLC bearer.

9. A User Equipment (UE) comprising:

a memory; and a processor coupled with the memory, wherein the processor is configured to:

receive, from a network, a Radio Resource Control (RRC) Release message, trigger a Packet Data Convergence Protocol (PDCP) entity to perform Service Data Unit (SDU) discard for a Signalling Radio Bearer (SRB) in a case where the RRC Release message is received and a Small Data Transmission (SDT) configuration is included in the RRC Release message, and determine, after the SDU discard is performed, whether a data volume of pending uplink data for an SDT procedure is less than or equal to a data volume threshold.

10. The UE according to claim 9, wherein the processor is configured to:

re-establish a Radio Link Control (RLC) entity for an RLC bearer in the case where the RRC Release message is received and the SDT configuration is included in the RRC Release message.

11. The UE according to claim 10, wherein the processor is configured to:

calculate, after the RLC entity is re-established and the SDU discard is performed, the data volume of pending uplink data for the SDT procedure.

12. The UE according to claim 10, wherein the processor is configured to:

determine, after the RLC entity is re-established and the SDU discard is performed, whether the data volume of pending uplink data for the SDT procedure is less than or equal to the data volume threshold.

13. The UE according to claim 9, wherein the processor is configured to:

initiate the SDT procedure in the case where the RRC Release message is received and the SDT configuration is included in the RRC Release message.

14. The UE according to claim 9, wherein the processor is configured to:

initiate the SDT procedure in a case where:

the RRC Release message is received and the SDT configuration is included in the RRC Release message, and the data volume is less than or equal to the data volume threshold.

15. A Radio Access Network (RAN) node comprising:

a memory; and a processor coupled with the memory, wherein the processor is configured to:

send, to a User Equipment (UE), a Radio Resource Control (RRC) Release message with a Small Data Transmission (SDT) configuration, wherein the SDT configuration is configured to cause the UE to trigger a Packet Data Convergence Protocol (PDCP) entity to perform Service Data Unit (SDU) discard for a Signalling Radio Bearer (SRB), and receive, from the UE, an RRC Resume message and uplink SDT data, wherein whether a data volume of the pending uplink data for an SDT procedure is less than or equal to a data volume threshold is determined, after the SDU discard is performed.

16. The RAN node according to claim 15, wherein the SDT configuration is configured to cause the UE to re-establish a Radio Link Control (RLC) entity for the RLC bearer.

* * * * *